United States Patent
Jain et al.

(10) Patent No.: US 10,474,552 B2
(45) Date of Patent: Nov. 12, 2019

(54) HARDWARE AND SOFTWARE DEBUG USING DATA DEPENDENCY TRACING

(71) Applicant: NXP USA, Inc., Austin, TX (US)

(72) Inventors: Sandeep Jain, Ghaziabad (IN); Ashish Mathur, New Delhi (IN)

(73) Assignee: NXP USA, Inc., Austin, TX (US)

( * ) Notice: Subject to any disclaimer, the term of this patent is extended or adjusted under 35 U.S.C. 154(b) by 250 days.

(21) Appl. No.: 15/598,601

(22) Filed: May 18, 2017

(65) Prior Publication Data
US 2018/0336080 A1 Nov. 22, 2018

(51) Int. Cl.
*G06F 11/36* (2006.01)
*G06F 11/26* (2006.01)

(52) U.S. Cl.
CPC .............. *G06F 11/26* (2013.01); *G06F 11/36* (2013.01); *G06F 11/3636* (2013.01)

(58) Field of Classification Search
CPC .............. G06F 11/3636; G06F 11/079; G06F 11/0751; G06F 11/0706; G06F 11/0778
See application file for complete search history.

(56) References Cited

U.S. PATENT DOCUMENTS

| | | | |
|---|---|---|---|
| 6,732,307 B1 * | 5/2004 | Edwards ............. | G06F 11/3636 714/45 |
| 7,055,070 B1 * | 5/2006 | Uhler .................. | G06F 11/3636 714/25 |
| 7,080,283 B1 * | 7/2006 | Songer ................ | G06F 11/3636 714/30 |
| 7,328,429 B2 | 2/2008 | Hooper et al. | |
| 7,363,467 B2 | 4/2008 | Vajapeyam et al. | |
| 7,395,489 B2 * | 7/2008 | Itou ..................... | G06F 11/1064 714/764 |
| 7,640,472 B2 * | 12/2009 | Laschinsky ......... | G06F 11/3672 714/724 |
| 8,214,701 B1 | 7/2012 | Malhotra et al. | |
| 8,713,369 B2 | 4/2014 | Mansson et al. | |
| 9,489,283 B1 * | 11/2016 | Popovici ............. | G06F 11/3636 |
| 9,852,046 B1 * | 12/2017 | Melnikov ............ | G06F 8/70 |
| 10,176,078 B1 * | 1/2019 | Motel .................. | G06F 11/3636 |

(Continued)

OTHER PUBLICATIONS

S. Friederich et al., "Hardware/software debugging of large scale many-core architectures," SBCCI 2014, Sep. 1-5, 2014, Aracaju, Brazil, 7 pages.

(Continued)

*Primary Examiner* — Yolanda L Wilson

(57) ABSTRACT

A system and method to record and trace data exchanges between cooperating hardware unit operations and software unit operations, providing an efficient mechanism to trace back to a root cause point from an observed failure point in a series of executed instructions performed within a data processing system. A data debug memory records information pertaining to each system memory access performed by instructions executed by the hardware and software units into separate memory information blocks. Linked relationships are created between certain ones of the memory information blocks to represent data dependencies that occurred between the instructions. These linked relationships may then be utilized to generate lists that map the various data dependencies between the executed instructions.

19 Claims, 23 Drawing Sheets

(56) References Cited

U.S. PATENT DOCUMENTS

| | | | | |
|---|---|---|---|---|
| 2002/0178405 A1* | 11/2002 | McCullough | ....... | G06F 11/3466 714/45 |
| 2007/0101198 A1* | 5/2007 | Ueno | ................. | G06F 11/3632 714/38.1 |
| 2008/0244328 A1* | 10/2008 | Bohizic | ............... | G06F 11/0769 714/45 |
| 2011/0307741 A1* | 12/2011 | Chen | ................... | G06F 11/3636 714/38.1 |
| 2012/0284563 A1* | 11/2012 | Mansson | ............ | G06F 11/3636 714/30 |
| 2016/0371139 A1* | 12/2016 | Stark | .................. | G06F 11/0787 |

OTHER PUBLICATIONS

O. Kocberber et al., "Asynchronous Memory Access Chaining," Proceedings of the VLDB Endowment, vol. 9, No. 4, pp. 252-263, Dec. 2015.

R. Willenberg et al., "SIMXMD: Simulation-Based HW/SW Co-Debugging," 2013 23rd International Conference on Field Programmable Logic and Applications, Sep. 2-4, 2013, 1 page.

S. Tallam et al., "Unified Control Flow and Data Dependence Traces," ACM Transactions on Architecture and Code Optimization, vol. 4, No. 3, Article 19 (Sep. 2007), 31 pages.

NXP Product Brief, "QorIQ LS2080A Processor Product Brief," NXP Semiconductors, Document No. LS2080APB, Rev. 1, May 2016, 26 pages.

Hedde et al., "A non intrusive simulation-based trace system to analyse Multiprocessor Systems-on-Chip software," TIMA Laboratory, IEEE, 2011, 7 pages.

\* cited by examiner

| MIB-ID | IP Type | Access Type | IP ID | INST BLOCK_ID | BLOCK_SEQ | BSE ADDR | SIZE | LBP | CLL | PLL | MRL | MWL | ... |
|---|---|---|---|---|---|---|---|---|---|---|---|---|---|
| MIB-1 | | | | | | | | | | | | | |
| MIB-2 | | | | | | | | | | | | | |
| MIB-3 | | | | | | | | | | | | | |
| MIB-4 | | | | | | | | | | | | | |
| MIB-5 | | | | | | | | | | | | | |
| MIB-6 | | | | | | | | | | | | | |
| MIB-7 | | | | | | | | | | | | | |
| ... | | | | | | | | | | | | | |
| MIB-N | | | | | | | | | | | | | |

| MIB - ID | IP Type | IP ID | INST ID | Access Type | ADDR | BLOCK_SEQ | LBP | MRL | MWL | BSE |
|---|---|---|---|---|---|---|---|---|---|---|
| ... | ... | ... | ... | ... | ... | ... | ... | ... | ... | ... |
| MIB - 10 | HW | IP1 | IP1 - K | RD | A1 | START | — | — | — | MIB - 13 |
| MIB - 11 | HW | IP1 | IP1 - K | RD | A2 | — | — | — | — | MIB - 13 |
| MIB - 12 | HW | IP1 | IP1 - K | WR | A3 | — | — | — | — | MIB - 13 |
| MIB - 13 | HW | IP1 | IP1 - K | WR | A4 | END | — | MIB-10, MIB-11 | MIB-12 | MIB - 13 |
| MIB - 14 | SW | T1 | — | RD | A3 | — | — | — | — | MIB - 16 |
| MIB - 15 | SW | T1 | — | RD | A4 | — | — | — | — | MIB - 16 |
| MIB - 16 | SW | T1 | — | WR | A5 | END | LB3 | MIB-14, MIB-15 | — | MIB - 16 |

Debug Data Memory
180

FIG. 7

Debug Data Memory — 180

| MIB-ID | IP Type | IP ID | INST ID | Access Type | ADDR | BLOCK_SEQ | LBP | MRL | MWL | BSE | CLL | PLL |
|---|---|---|---|---|---|---|---|---|---|---|---|---|
| ... | ... | ... | ... | ... | ... | ... | ... | ... | ... | ... | ... | ... |
| MIB-10 | HW | IP1 | IP1-K | RD | A1 | START | — | — | — | MIB-13 | — | — |
| MIB-11 | HW | IP1 | IP1-K | RD | A2 | — | — | — | — | MIB-13 | — | — |
| MIB-12 | HW | IP1 | IP1-K | WR | A3 | — | — | MIB-10, MIB-11 | — | MIB-13 | MIB-14 | — |
| MIB-13 | HW | IP1 | IP1-K | WR | A4 | END | — | — | MIB-12 | MIB-13 | MIB-15 | — |
| MIB-14 | SW | T1 | — | RD | A3 | — | — | — | — | MIB-16 | — | MIB-12 |
| MIB-15 | SW | T1 | — | RD | A4 | END | LB3 | — | — | MIB-16 | — | MIB-13 |
| MIB-16 | SW | T1 | — | WR | A5 | — | — | MIB-14, MIB-15 | — | MIB-16 | — | — |

FIG. 8

| ID | Instruction Action | MIB Index | Access Type | ADDR | SIZE | Load Blocks [REF_CNT] | Register Load Map Bank R0 | R1 | R2 | R3 | MRL | BSE | Comments |
|---|---|---|---|---|---|---|---|---|---|---|---|---|---|
| 1 | R1=A1 | - | - | - | - | - | - | - | - | - | - | - | Write constant A1 to Reg R1 |
| 2 | R2=S2 | - | - | - | - | - | - | - | - | - | - | - | Write constant S1 to Reg R2 |
| 3 | R0=MEM[R1+,R2] | 1 | RD | A1 | S1 | LB0: 1[1] | LB0 | - | - | - | - | 4,6 | Read Memory Address A1 Size S1 and write into Reg R0, increment Reg R1 |
| 4 | R0= R0+MEM[R1+,R2] | 2 | RD | A1+1 | S1 | LB0: 1,2[1] | LB0 | - | - | - | - | - | Read Memory Address (A1+1) Size S1 and update Reg R0 Increment Reg R1 |
| 5 | R3=R0 | - | - | - | - | LB0: 1,2[2] | LB0 | - | - | LB0 | - | - | Reg R0 content is moved to Reg R3 |
| 6 | R3=R3+ MEM[R1+,R2] | 3 | RD | A1+2 | S1 | LB0: 1,2[1] LB1: 1,2,3[1] | LB0 | - | - | LB1 | - | - | Read Memory Address (A1+2) Size S1 and update Reg R3 Increment Reg R1 |
| 7 | MEM[R1,R2]=R0 | 4 | WR | A1+3 | S1 | LB0: 1,2[2] LB1: 1,2,3[1] | LB0 | - | - | LB1 | 1,2 | - | Write Memory Address (A1+3) Size S1 Using Data Stored in Reg R0 |
| 8 | R1=A2 | - | - | - | - | LB0: 1,2[2] LB1: 1,2,3[1] | LB0 | - | - | LB1 | - | - | Write Constant A2 to Register R1 |
| 9 | R2=S2 | - | - | - | - | LB0: 1,2[2] LB1: 1,2,3[1] | LB0 | - | - | LB1 | - | - | Write Constant S2 to Register R2 |
| 10 | R0=MEM[R1,R2] | 5 | RD | A2 | S2 | LB0: 1,2[1] LB1: 1,2,3[1] LB2: 5[1] | LB2 | - | - | LB1 | - | - | Read Memory Address A2 Size S2 and Load into Reg R0 |
| 11 | MEM[R1+, R2]=R3 | 6 | WR | A2 | S2 | LB0: 1,2[1] LB1: 1,2,3[2] LB2: 5[1] | LB2 | - | - | LB1 | 1,2,3 | - | Write Memory Address A2 Size S2 using data stored in Reg R3, Increment Reg R1 |
| 12 | R3=R3+R0 | - | - | - | - | LB0: 1,2[1] LB1: 1,2,3[1] LB3:1,2,3,5[1] | LB2 | - | - | LB3 | - | - | Reg R3 content is updated using content of Reg R0 |
| 13 | R3=MEM[R1+,R2] | 7 | RD | A2+1 | S2 | LB0: 1,2[1] LB1: 1,2,3[1] LB2: 5[1] LB4: 7[1] | LB2 | - | - | LB4 | - | 8 | Read Memory Address (A2) Size S2 and write into Reg R3, Increment Reg R1 |
| 14 | MEM[R1,R2]=R3 | 8 | WR | A2+2 | S2 | LB0: 1,2[1] LB1: 1,2,3[1] LB2: 5[1] LB4: 7[2] | LB2 | - | - | LB4 | 7 | - | Write Memory Address A2 Size S2 using data stored in Reg R3 |

FIG. 10

| MIB ID | IP TYPE | Access Type | IP ID | INST ID | BLOCK_SEQ | BSE | ADDR | SIZE | CLL | PLL | MRL | MWL | Comments |
|---|---|---|---|---|---|---|---|---|---|---|---|---|---|
| 1 | HW | RD | FDMA | 1 | START | – | A1 | S1 | – | – | – | – | FDMA reads annotation -1 |
| 2 | HW | RD | FDMA | 1 | – | – | A2 | S2 | – | – | – | – | FDMA reads annotation -2 |
| 3 | HW | RD | FDMA | 1 | – | – | A3 | S3 | – | – | – | – | FDMA reads packet header |
| 4 | HW | WR | FDMA | 1 | – | – | A4 | S1 | – | – | – | – | FDMA writes annotation -1 |
| 5 | HW | WR | FDMA | 1 | – | – | A5 | S2 | – | – | – | – | FDMA writes annotation -2 |
| 6 | HW | WR | FDMA | 1 | END | – | A6 | S3 | – | – | – | – | FDMA writes packet header |
| 7 | SW | RD | CPU0 | – | – | – | A4 | S1 | – | – | – | – | SW reads annotation -1 |
| 8 | SW | RD | CPU0 | – | – | – | A5 | S2 | – | – | – | – | SW reads annotation -2 |
| 9 | SW | RD | CPU0 | – | – | – | A6 | S3 | – | – | – | – | SW reads packet header |
| 10 | SW | WR | CPU0 | – | END | – | A8 | S8 | – | – | – | – | SW writes TLU command |
| 11 | HW | RD | TLU | 2 | START | – | A8 | S8 | – | – | – | – | TLU reads command |
| 12 | HW | RD | TLU | 2 | – | – | A6 | S3 | – | – | – | – | TLU reads packet header |
| 13 | HW | WR | TLU | 2 | END | – | A9 | S9 | – | – | – | – | TLU writes lookup result |
| 14 | SW | RD | CPU0 | – | – | – | A9 | S9 | – | – | – | – | SW reads TLU result |
| 15 | SW | WR | CPU0 | – | END | – | A10 | S10 | – | – | – | – | SW writes FDMA command |
| 16 | HW | RD | FDMA | 3 | START | – | A10 | S10 | – | – | – | – | FDMA reads SW command |
| 17 | HW | WR | FDMA | 3 | END | – | A11 | S11 | – | – | – | – | FDMA writes status |
| 18 | SW | RD | CPU0 | – | – | – | A11 | S11 | – | – | – | – | SW reads FDMA status |
| 19 | SW | WR | CPU0 | – | END | – | A12 | S12 | – | – | – | – | SW write to generate Interrupt or create error handling SW task |

| MIB ID | IP TYPE | Access Type | IP ID | INST ID | BLOCK_SEQ | BSE | ADDR | SIZE | CLL | PLL | MRL | MWL | Comments |
|---|---|---|---|---|---|---|---|---|---|---|---|---|---|
| 1 | HW | RD | FDMA | 1 | START | 6 | A1 | S1 | -- | -- | -- | -- | FDMA reads annotation -1 |
| 2 | HW | RD | FDMA | 1 | -- | 6 | A2 | S2 | -- | -- | -- | -- | FDMA reads annotation -2 |
| 3 | HW | RD | FDMA | 1 | -- | 6 | A3 | S3 | -- | -- | -- | -- | FDMA reads packet header |
| 4 | HW | WR | FDMA | 1 | -- | 6 | A4 | S1 | -- | -- | -- | -- | FDMA writes annotation -1 |
| 5 | HW | WR | FDMA | 1 | -- | 6 | A5 | S2 | -- | -- | -- | -- | FDMA writes annotation -2 |
| 6 | HW | WR | FDMA | 1 | END | 6 | A6 | S3 | -- | -- | 1,2,3 | 4,5,6 | FDMA writes packet header |
| 7 | SW | RD | CPU0 | -- | -- | 10 | A4 | S1 | -- | -- | -- | -- | SW reads annotation -1 |
| 8 | SW | RD | CPU0 | -- | -- | 10 | A5 | S2 | -- | -- | -- | -- | SW reads annotation -2 |
| 9 | SW | RD | CPU0 | -- | -- | 10 | A6 | S3 | -- | -- | -- | -- | SW reads packet header |
| 10 | SW | WR | CPU0 | -- | END | 10 | A8 | S8 | -- | -- | 7,8,9 | 10 | SW writes TLU command |
| 11 | HW | RD | TLU | 2 | START | 13 | A8 | S8 | -- | -- | -- | -- | TLU reads command |
| 12 | HW | RD | TLU | 2 | -- | 13 | A6 | S3 | -- | -- | -- | -- | TLU reads packet header |
| 13 | HW | WR | TLU | 2 | END | 13 | A9 | S9 | -- | -- | 11,12 | 13 | TLU writes lookup result |
| 14 | SW | RD | CPU0 | -- | -- | 15 | A9 | S9 | -- | -- | -- | -- | SW reads TLU result |
| 15 | SW | WR | CPU0 | -- | END | 15 | A10 | S10 | -- | -- | 14 | 15 | SW writes FDMA command |
| 16 | HW | RD | FDMA | 3 | START | 17 | A10 | S10 | -- | -- | -- | -- | FDMA reads SW command |
| 17 | HW | WR | FDMA | 3 | END | 17 | A11 | S11 | -- | -- | 16 | 17 | FDMA writes status |
| 18 | SW | RD | CPU0 | -- | -- | 19 | A11 | S11 | -- | -- | -- | -- | SW reads FDMA status |
| 19 | SW | WR | CPU0 | -- | END | 19 | A12 | S12 | -- | -- | 18 | 19 | SW write to generate Interrupt or create error handling SW task |

| MIB ID | IP TYPE | Access Type | IP ID | INST ID | BLOCK_SEQ | BSE | ADDR | SIZE | CLL | PLL | MRL | MWL | Comments |
|---|---|---|---|---|---|---|---|---|---|---|---|---|---|
| 1 | HW | RD | FDMA | 1 | START | 6 | A1 | S1 | – | – | – | – | FDMA reads annotation -1 |
| 2 | HW | RD | FDMA | 1 | – | 6 | A2 | S2 | – | – | – | – | FDMA reads annotation -2 |
| 3 | HW | RD | FDMA | 1 | – | 6 | A3 | S3 | – | – | – | – | FDMA reads packet header |
| 4 | HW | WR | FDMA | 1 | – | 6 | A4 | S1 | 7 | – | – | – | FDMA writes annotation -1 |
| 5 | HW | WR | FDMA | 1 | – | 6 | A5 | S2 | 8 | – | – | – | FDMA writes annotation -2 |
| 6 | HW | WR | FDMA | 1 | END | 6 | A6 | S3 | 9,12 | – | 1,2,3 | 4,5,6 | FDMA writes packet header |
| 7 | SW | RD | CPU0 | – | – | 10 | A4 | S1 | – | 4 | – | – | SW reads annotation -1 |
| 8 | SW | RD | CPU0 | – | – | 10 | A5 | S2 | – | 5 | – | – | SW reads annotation -2 |
| 9 | SW | RD | CPU0 | – | – | 10 | A6 | S3 | – | 6 | – | – | SW reads packet header |
| 10 | SW | WR | CPU0 | – | END | 10 | A8 | S8 | 11 | – | 7,8,9 | 10 | SW writes TLU command |
| 11 | HW | RD | TLU | 2 | START | 13 | A8 | S8 | – | 10 | – | – | TLU reads command |
| 12 | HW | RD | TLU | 2 | – | 13 | A6 | S3 | – | 6 | – | – | TLU reads packet header |
| 13 | HW | WR | TLU | 2 | END | 13 | A9 | S9 | 14 | – | 11,12 | 13 | TLU writes lookup result |
| 14 | SW | RD | CPU0 | – | – | 15 | A9 | S9 | – | 13 | – | – | SW reads TLU result |
| 15 | SW | WR | CPU0 | – | END | 15 | A10 | S10 | 16 | – | 14 | 15 | SW writes FDMA command |
| 16 | HW | RD | FDMA | 3 | START | 17 | A10 | S10 | – | 15 | – | – | FDMA reads SW command |
| 17 | HW | WR | FDMA | 3 | END | 17 | A11 | S11 | 18 | – | 16 | 17 | FDMA writes status |
| 18 | SW | RD | CPU0 | – | – | 19 | A11 | S11 | – | 17 | – | – | SW reads FDMA status |
| 19 | SW | WR | CPU0 | – | END | 19 | A12 | S12 | – | – | 18 | 19 | SW write to generate Interrupt or create error handling SW task |

| Iteration | Process Block | Example of Producer Tracing for the MIB data record MIB-16 | | | | | | |
|---|---|---|---|---|---|---|---|---|
| 1 | 1401 | MIB_J = MIB_J_ROOT = MIB-16 | | | | | | |
| 2 | 1402 | Yes | | | | | | |
| 3 | 1403 | No | | | | | | |
| 4 | 1405 | Field1 = BSE.MRL, Field2 = PLL | | | | | | |
|   |   | Yes/No | MIB J | MIB K | MIB J' | MIB K' | Stack | Producer List |
| 5 | 1409 | Yes | MIB-16 |   |   | MIB-14 | -- |   |
| 6 | 1410 | No |   |   |   |   |   |   |
| 7 | 1412 |   |   | MIB-14 |   |   |   | MIB-14 |
| 8 | 1413 | Yes |   |   | MIB-12 |   |   |   |
| 9 | 1414 |   | MIB-12 |   |   |   | MIB-16 | MIB-14, MIB-12 |
| 10 | 1409 | Yes |   |   |   | MIB-10 |   |   |
| 11 | 1410 | Yes |   |   |   |   |   |   |
| 12 | 1411 |   |   |   |   |   | MIB-14, MIB-16 |   |
| 13 | 1412 |   |   | MIB-10 |   |   |   | MIB-14, MIB-12, MIB-10 |
| 14 | 1413 | No |   |   |   |   |   |   |
| 15 | 1418 | Yes |   |   |   |   |   |   |
| 16 | 1415 |   |   | MIB-14 |   |   | MIB-16 |   |
| 17 | 1409 | Yes |   |   |   | MIB-11 |   |   |
| 18 | 1410 | Yes |   |   |   |   |   |   |
| 19 | 1411 |   |   |   |   |   | MIB-14, MIB-16 |   |
| 20 | 1412 |   |   | MIB-11 |   |   |   | MIB-14, MIB-12, MIB-10, MIB-11 |
| 21 | 1413 | No |   |   |   |   |   |   |
| 22 | 1418 | Yes |   |   |   |   |   |   |
| 23 | 1415 |   |   | MIB-14 |   |   | MIB-16 |   |
| 24 | 1409 | No |   |   |   |   |   |   |
| 25 | 1416 | Yes |   |   |   |   |   |   |
| 26 | 1417 |   | MIB-16 |   |   |   | -- |   |
| 27 | 1413 | No |   |   |   |   |   |   |
| 28 | 1418 | No |   |   |   |   |   |   |
| 29 | 1409 | Yes |   |   |   | MIB-15 |   |   |
| 30 | 1410 | No |   |   |   |   |   |   |
| 31 | 1412 |   |   | MIB-15 |   |   |   | MIB-14, MIB-12, MIB-10, MIB-11, MIB-15 |
| 32 | 1413 | Yes |   |   | MIB-13 |   |   |   |
| 33 | 1414 |   | MIB-13 |   |   |   | MIB-16 | MIB-14, MIB-12, MIB-10, MIB-11, MIB-15, MIB-13 |
| 34 | 1409 | Yes |   |   |   | MIB-10 |   |   |
| 35 | 1410 | Yes |   |   |   |   |   |   |
| 36 | 1411 |   |   |   |   |   | MIB-15, MIB-16 |   |
| 37 | 1412 |   |   | MIB-10 |   |   |   | MIB-14, MIB-12, MIB-10, MIB-11, MIB-15, MIB-13 |
| 38 | 1413 | No |   |   |   |   |   |   |
| 39 | 1418 | Yes |   |   |   |   |   |   |
| 40 | 1415 |   |   | MIB-15 |   |   | MIB-16 |   |
| 41 | 1409 | Yes |   |   |   | MIB-11 |   |   |
| 42 | 1410 | Yes |   |   |   |   |   |   |
| 43 | 1411 |   |   |   |   |   | MIB-15, MIB-16 |   |
| 44 | 1412 |   |   | MIB-11 |   |   |   | MIB-14, MIB-12, MIB-10, MIB-11, MIB-15, MIB-13 |
| 45 | 1413 | No |   |   |   |   |   |   |
| 46 | 1418 | Yes |   |   |   |   |   |   |
| 47 | 1415 |   |   | MIB-15 |   |   | MIB-16 |   |
| 48 | 1409 | No |   |   |   |   |   |   |
| 49 | 1416 | Yes |   |   |   |   |   |   |
| 50 | 1417 |   | MIB-16 |   |   |   | -- |   |
| 51 | 1413 | No |   |   |   |   |   |   |
| 52 | 1418 | No |   |   |   |   |   |   |
| 53 | 1409 | No |   |   |   |   |   |   |
| 54 | 1416 | No |   |   |   |   |   |   |

FIG. 20

| Iteration | Process Block | Example of Producer Tracing for the MIB data record MIB-14 | | | | | | |
|---|---|---|---|---|---|---|---|---|
| 1 | 1401 | MIB_J = MIB_J_ROOT = MIB-14 | | | | | | |
| 2 | 1402 | Yes | | | | | | |
| 3 | 1403 | Yes | | | | | | |
| 4 | 1404 | Field1 = PLL, Field2 = BSE.MRL | | | | | | |
| | | Yes/No | MIB_J | MIB_K | MIB_J' | MIB_K' | Stack | Producer List |
| 5 | 1409 | Yes | MIB-14 | | | MIB-12 | – | |
| 6 | 1410 | No | | | | | | |
| 7 | 1412 | | | MIB-12 | | | | MIB-12 |
| 8 | 1413 | Yes | | | MIB-10 | | | |
| 9 | 1414 | | MIB-10 | | | | MIB-14 | MIB-12, MIB-10 |
| 10 | 1409 | No | | | | | | |
| 11 | 1416 | Yes | | | | | | |
| 12 | 1417 | | MIB-14 | | | | – | |
| 13 | 1413 | Yes | | | MIB-11 | | | |
| 14 | 1414 | | MIB-11 | | | | MIB-14 | MIB-12, MIB-10, MIB-11 |
| 15 | 1409 | No | | | | | | |
| 16 | 1416 | Yes | | | | | | |
| 17 | 1417 | | MIB-14 | | | | – | |
| 18 | 1413 | No | | | | | | |
| 19 | 1418 | No | | | | | | |
| 20 | 1409 | No | | | | | | |
| 21 | 1416 | No | | | | | | |

FIG. 21

| Iteration | Process Block | Example of Consumer Tracing for the MIB data record MIB-10 | | | | | |
|---|---|---|---|---|---|---|---|
| 1 | 1401 | MIB_J = MIB_J_ROOT = MIB-10 | | | | | |
| 2 | 1402 | No | | | | | |
| 3 | 1406 | Yes | | | | | |
| 4 | 1407 | Field1 = BSE.MWL, Field2 = CLL | | | | | |
| | | Yes/No | MIB J | MIB K | MIB J' | MIB K' | Stack | Consumer List |
| 5 | 1409 | Yes | MIB-10 | | | MIB-12 | -- | |
| 6 | 1410 | No | | | | | | |
| 7 | 1412 | | | MIB-12 | | | | MIB-12 |
| 8 | 1413 | Yes | | | MIB-14 | | | |
| 9 | 1414 | | MIB-14 | | | | MIB-10 | MIB-12, MIB-14 |
| 10 | 1409 | Yes | | | | MIB-16 | | |
| 11 | 1410 | Yes | | | | | | |
| 12 | 1411 | | | | | | MIB-12, MIB-10 | |
| 13 | 1412 | | | MIB-16 | | | | MIB-12, MIB-14, MIB-16 |
| 14 | 1413 | No | | | | | | |
| 15 | 1418 | Yes | | | | | | |
| 16 | 1415 | | | MIB-12 | | | MIB-10 | |
| 17 | 1409 | No | | | | | | |
| 18 | 1416 | Yes | | | | | | |
| 19 | 1417 | | MIB-10 | | | | -- | |
| 20 | 1413 | No | | | | | | |
| 21 | 1418 | No | | | | | | |
| 22 | 1409 | Yes | | | | MIB-13 | | |
| 23 | 1410 | No | | | | | | |
| 24 | 1412 | | | MIB-13 | | | | MIB-12, MIB-14, MIB-16, MIB-13 |
| 25 | 1413 | Yes | | | MIB-15 | | | |
| 26 | 1414 | | MIB-15 | | | | MIB-10 | MIB-12, MIB-14, MIB-16, MIB-13, MIB-15 |
| 27 | 1409 | Yes | | | | MIB-16 | | |
| 28 | 1410 | Yes | | | | | | |
| 29 | 1411 | | | | | | MIB-10, MIB-13 | |
| 30 | 1412 | | | MIB-16 | | | | MIB-12, MIB-14, MIB-16, MIB-13, MIB-15 |
| 31 | 1413 | No | | | | | | |
| 32 | 1418 | Yes | | | | | | |
| 33 | 1415 | | | MIB-13 | | | MIB-10 | |
| 34 | 1409 | No | | | | | | |
| 35 | 1416 | Yes | | | | | | |
| 36 | 1417 | | MIB-10 | | | | | |
| 37 | 1413 | No | | | | | | |
| 38 | 1418 | Yes | | | | | | |
| 39 | 1409 | No | | | | | | |
| 40 | 1416 | No | | | | | | |

FIG. 22

HARDWARE AND SOFTWARE DEBUG USING DATA DEPENDENCY TRACING

TECHNICAL FIELD

The present invention relates in general to debugging of errors occurring in data processing systems.

BACKGROUND INFORMATION

Contemporary data processing systems often include a combination of software executing on one or more general purpose processors cooperating with dedicated hardware (e.g., accelerator engines) that provide offload from the software for specific system functionalities. Such systems are characterized by numerous data exchanges between the cooperating hardware and software entities.

A problem with such data processing systems is the inability to effectively identify (debug) what causes a failure in such systems. Moreover, when the data processing system is integrated on a silicon chip, providing sufficient system observability to enable the debugging of software and/or hardware errors during runtime can be very complex and costly. Such a problem is compounded when the data processing system to be debugged includes a number of independently operating hardware and software entities that are able to communicate with one another and perform tasks in an interactive way such that some parts of a task are performed by one entity, while other parts of the task are performed by one or more other entities.

The root cause of a failure in such systems at a given point in time often results from an error in the data exchanged between the cooperating hardware and software entities at arbitrary points leading back in time. Thus, there is a desire in the art to provide a data records methodology and apparatus for debugging of such hardware and software failures.

Contemporary debugging techniques merely provide capabilities focused on either an isolated software debug or an isolated hardware debug. In particular, contemporary software debugging does not facilitate debugging of hardware, while contemporary hardware debugging does not facilitate software debugging. Generally, hardware and software debugging are performed separately, in isolation from each other. Consequently, contemporary debugging techniques do not provide any specific schema or mechanism for debugging of failures occurring in a complex hardware and software partitioned system in which the hardware and software entities cooperatively work to achieve system level functionality. Additionally, there is no data records schema available to effectively trace system failures to erroneous data exchanges between specific hardware and/or software entities.

BRIEF DESCRIPTION OF THE DRAWINGS

FIG. 2 illustrates an exemplary memory information block, which may be recorded within a debug data memory device.

FIGS. 6-8 illustrate entries made within memory information block data records pertaining to the exemplary Operations illustrated in FIG. 5.

FIG. 10 illustrates usage of entries in a memory information block for use for achieving Intra-Operation Dependency Chaining of software store instructions.

FIGS. 17-19 illustrate memory information block entries pertaining to the exemplary memory accesses described with respect to FIG. 16.

FIGS. 20-22 illustrate tables pertaining to exemplary hardware and software data dependency tracing as described with respect to FIGS. 14-15.

DETAILED DESCRIPTION

Aspects of the present invention provide a system and method to record and trace data exchanges between cooperating hardware unit operations and software unit operations within a data processing system, providing an efficient mechanism to trace through executed instructions back to a root cause point from an observed failure point in a series of executed instructions. A data debug memory coupled to the data processing system records, into separate memory information blocks, information pertaining to each system memory access performed by the executed instructions. The recorded information in the memory information blocks is used to create linked relationships between certain ones of the memory information blocks to represent data dependencies that occurred between the instructions. These linked relationships may then be utilized to generate lists that map the various data dependencies between the executed instructions.

Figure 1:
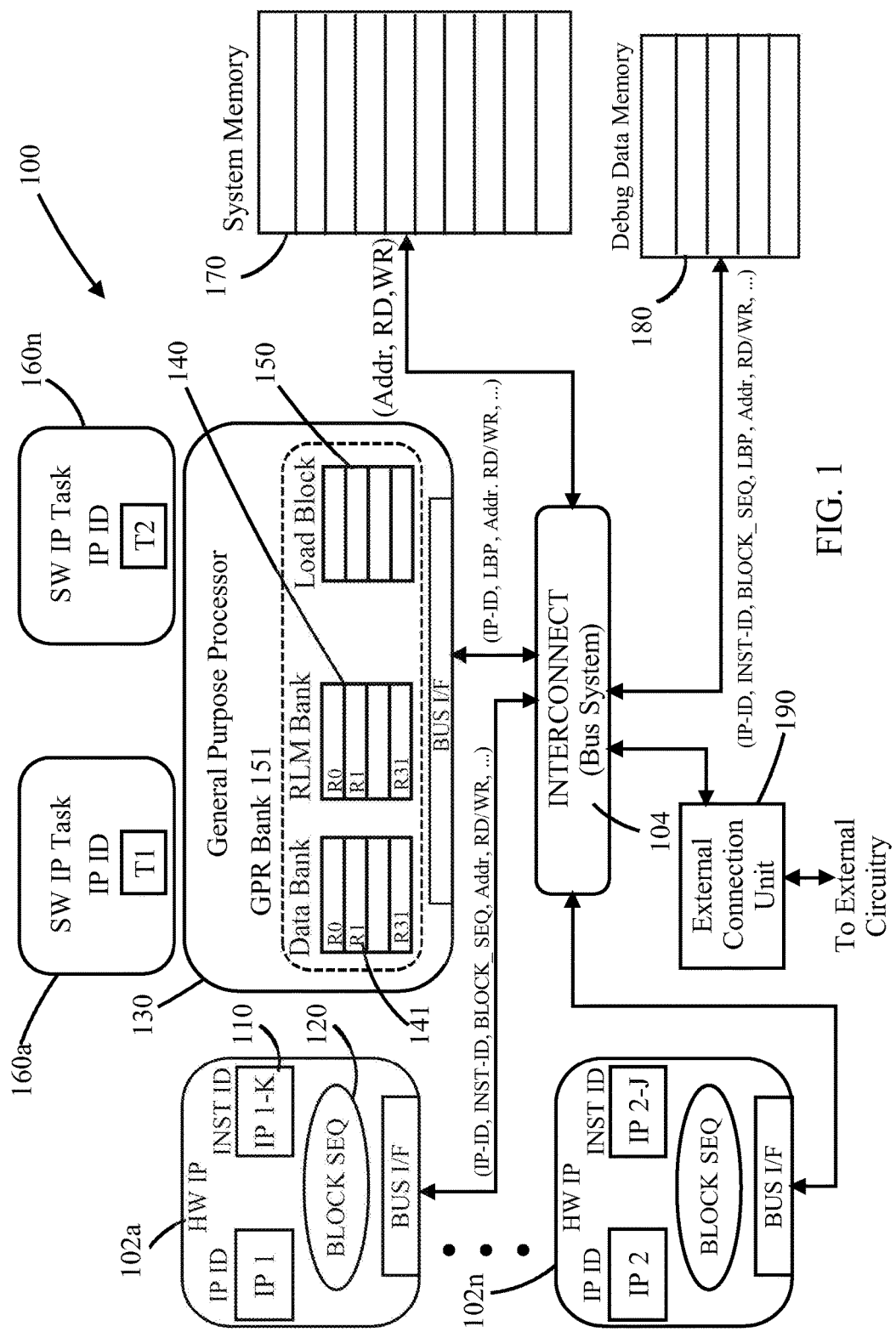
FIG. 1 illustrates an exemplary data processing system configured in accordance with embodiments of the present invention.

FIG. 1 illustrates a portion of an exemplary data processing system 100, configured in accordance with embodiments of the present invention, which includes one or more arbitrary number, n (where n≥1), of hardware units and one or more arbitrary number, n (where ≥1), General Purpose Processor ("GPP") core(s) 130 (only one GPP core 130 is shown for the sake of simplicity) interconnected by interconnect circuitry 104 (e.g., by a bus system) to a system memory 170 and a debug data memory 180. The data processing system 100 may include other hardware, which is not shown for the sake of simplicity.

The interconnect circuitry 104 can be implemented by means of any architecture that enables any one of the units, acting as a source, to communicate with any other one of the units, acting as a destination. Within embodiments of the present invention, the interconnect circuitry 104 may be configured with a request-response paradigm, i.e., there is a response path (for exchange of information) returning to the source from the destination. This may include the interconnection between the debug data memory 180 and the interconnect circuitry 104 being bi-directional so that information recorded in the debug data memory 180 can be shared with the other elements coupled to the interconnect circuitry 104. For the sake of example, and without limitation, suitable architectures for the interconnect circuitry 104 include a bus network architecture, a ring network, and a star network. Input/Output functionality to the data processing system 100 may be provided by an external connection unit 190, which can be coupled (e.g., with a JTAG interface) to external circuitry/equipment (not shown), which may be utilized to transfer records from the debug data memory 180 to the external circuitry/equipment. The data processing system 100 may include other hardware typically found within any data processing system, but which is not shown for the sake of simplicity.

The one or more hardware units, which may be implemented as n Hardware ("HW") IP module(s) 102a . . . 102n, perform Operations (defined hereinafter) separate from software running within the one or more GPP core(s) 130. In electronic circuit design, a hardware IP ("intellectual property") module (also referred to as a core or block) is a reusable unit of a logic, cell, or chip layout design. As an example, a HW IP module may be a block of logic circuitry (e.g., a field programmable gate array ("FPGA") or application specific integrated circuit ("ASIC")) configured for performing one or more predetermined Operations. Within some embodiments of the present invention, the one or more hardware units are implemented in hardware (e.g., including, but not limited to, programmable logic) separate from the one or more GPP core(s) 130. As a result, instead of performing certain Operations by a software unit running in a GPP core 130, these certain Operations are performed by a hardware unit. Within embodiments of the present invention, at least one hardware unit Operation and at least one software unit Operation are concurrently being performed within the data processing system 100. Embodiments of the present invention are configured to perform data dependence tracing of such concurrently running hardware and software unit Operations without having to suspend performance of the software unit Operation in order to run the hardware unit Operation.

Each of the one or more GPP core(s) 130 may be configured to perform logical groupings of software program instructions by one or more arbitrary number, a (where n≥1), of software units, which may be implemented as n Software ("SW") IP Task(s) 160a . . . 160n. Within embodiments of the present invention, the n Software ("SW") IP Task(s) 160a . . . 160n may utilize any one or more of then HW IP modules 102a . . . 102n for performing certain Operations, such as in response to an instruction running in the software unit.

The term Operation is used herein to generally refer to a production (e.g., computation) of a result (e.g., data) by a hardware unit (e.g., a HW IP module) or a software unit (e.g., a SW IP Task) based on one or more relevant data read(s) from a memory device (e.g., the system memory 170), which culminates in one or more data write(s) to the system memory. An example of an Operation performed by a hardware unit may include execution of a pre-defined command supported by the hardware unit (for example, an encryption command for a hardware unit implemented as a security hardware accelerator IP block). Such an encryption hardware unit Operation, as an example, may read a command descriptor from the system memory, read plain text data front the system memory, and write out encrypted data to the system memory following completion of the encryption hardware unit Operation. An example of an Operation performed by a software unit may include a logical grouping of software program instructions that culminate in an execution of a store instruction, which results in writing data to the system memory based on a specific manipulation of input data read from the system memory.

Consequently, an Operation performed by a hardware unit (e.g., a HW IP module) or a software unit (e.g., a SW IP Task) may involve multiple accesses to the system memory 170 (each such access also referred to herein as a "system memory 170 access" or simply a "system memory access"), such as READ instructions resulting in data read from the system memory 170, and WRITE instructions resulting in data written to the system memory 170.

The functionality of any two or more hardware units, any two or more software units, or any two or more Operations performed within the data processing system 100 may or may not be different from one another.

The one or more HW IP modules 102a . . . 102n and the one or more SW IP Tasks 160a . . . 160n my be any well-known (or developed in the future) hardware and software units, respectively, utilized for processing data in a data processing system. As disclosed herein, the hardware and software units form the building blocks of a data processing system, such as the data processing system 100, which may be implemented within an integrated circuit, such as a system-on-a-chip ("SOC").

Referring again to FIG. 1, each of the one or more HW IP modules 102a . . . 102n may be designated with a unique identifier referred to herein as an IP ID value, which uniquely identifies each HW IP module as the source of a system memory access over the interconnect circuitry 104. For example, in the exemplary data processing system 100, the HW IP module 102a is identified with an IP ID of IP1, the HW IP module 102n is identified with an IP ID of IP2, and so on. For example, in the exemplary data processing system 100, all system memory accesses performed by the HW IP module 102a may be identified on the interconnect circuitry 104 with an IP ID of IP1, all system memory access performed by the HW IP module 102n may be identified on the interconnect circuitry 104 with an IP ID of IP2, and so on.

An INST ID 110 may be assigned that provides a unique identifier on the interconnect circuitry 104 for all system memory accesses pertaining to a given Operation performed by a particular HW IP module. For example, in the exemplary data processing system 100, all system memory accesses pertaining to a particular Operation performed by the HW IP module 102a may be identified on the interconnect circuitry 104 with an INST ID of IP1-K, all system memory access pertaining to a particular Operation performed by the HW IP module 102n may be identified on the interconnect circuitry 104 with an INST ID of IP2-J, and so on. A subsequent system memory access performed by the HW IP module 102a may be identified on the interconnect circuitry 104 with a different INST ID (e.g., IP1-M, etc.) if that subsequent system memory access pertains to a different Operation being performed by the HW IP module 102a than the Operation pertaining to the INST ID of IP1-K.

BLOCK_SEQ 120 is a logic identifier that provides START and END indications (i.e., values) on the interconnect circuitry 104 corresponding to the first and last system memory accesses, respectively, for a particular Operation initiated by a HW IP module. In general, each HW IP module may be configured with logic circuitry to control sequences of operations using state machine(s) and associated data paths. The BLOCK_SEQ 120 may be configured with such logic circuitry to generate an appropriate BLOCK_SEQ value (either START or END) that is then transmitted onto the interconnect circuitry 104.

The IP ID, INST ID, and BLOCK_SEQ values associated with system memory 170 accesses by HW IP module(s) are recorded in the debug data memory 180 as further discussed herein with respect to FIG. 2.

Each of the one or more GPP core(s) 130 may include a general purpose register ("GPR") Bank 151. The GPR Bank 151 may include a Data Bank 141 of general purpose registers. In accordance with embodiments of the present invention, each of the one or more GPP core(s) 130 may be configured with additional data records, identified herein as the Register Load Map ("RLM") Bank 140 (which may be implemented as part of the GPR Bank 151) and the Load Block ("LB") 150 (which may be implemented in a random access memory ("RAM")). Alternatively, the RLM Bank 140 and/or LB 150 may be implemented in a memory device separate from the GPP core(s) 130, such as a RAM coupled to the GPP core(s) 130, or in the debug data memory 180.

The RLM Bank 140 may be configured as an array of entries, having an entry pertaining to each Data. Bank 141 register in the GPR Bank 151, which along with information recorded in the LB 150, provides a list of memory locations whose data has been used to compute the data stored in the registers of the Data Bank 141. When a STORE instruction is executed by a software unit (e.g., any of the SW IP Tasks 160a . . . 106n), the current snapshot of the RLM Bank 140 entry corresponding to the Data Bank 141 register that provided the stored data (also referred to herein as the Load Block Pointer ("LBP")) is also transmitted over the interconnect circuitry 104 and recorded in the debug data memory 180 as further described herein with respect to FIG. 2. Recording of such Load Block Pointers in the debug data memory 180 is also described herein with respect to FIG. 11.

Figure 3:
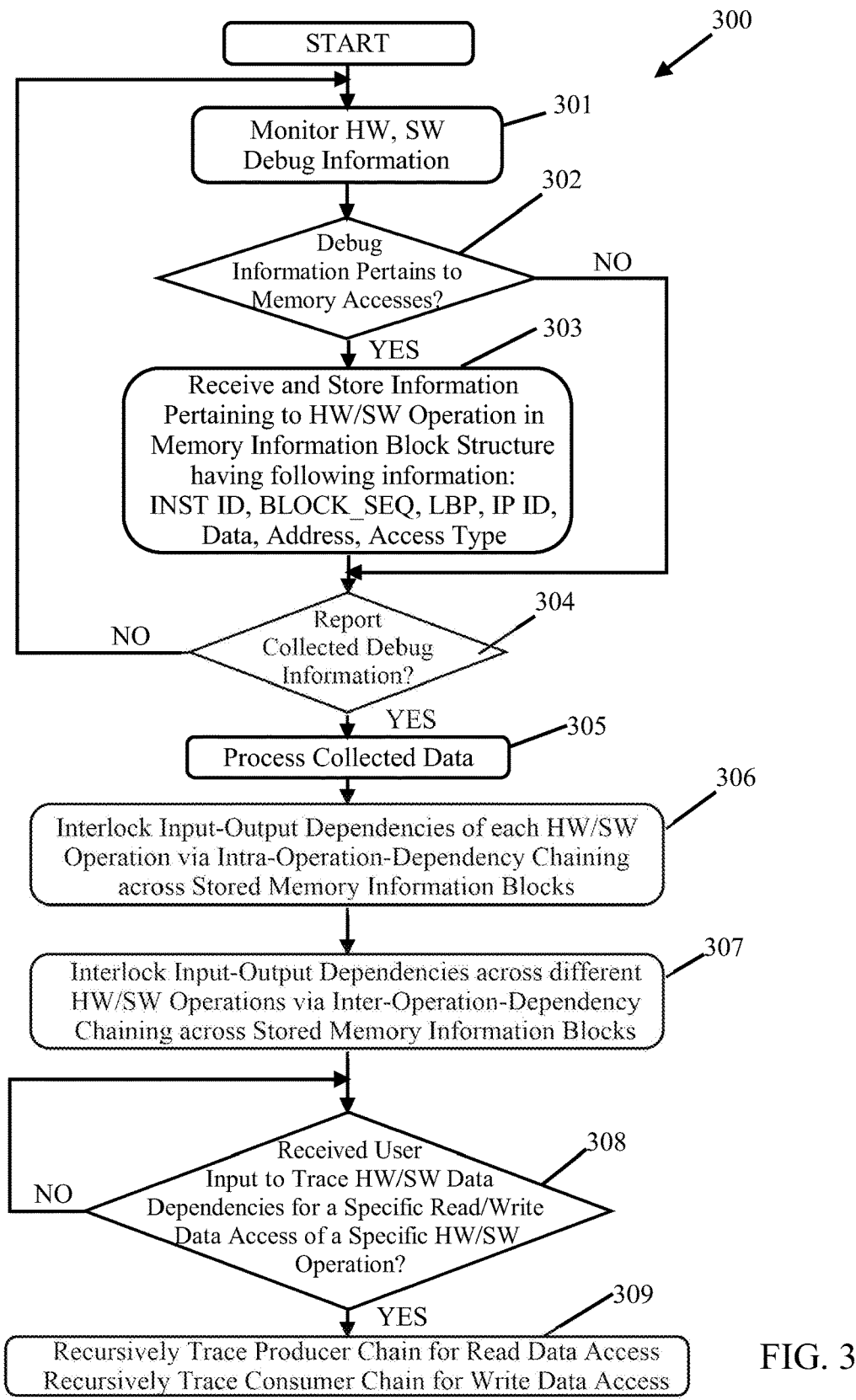
FIG. 3 illustrates a flow chart diagram configured in accordance with embodiments of the present invention, and also illustrates a block diagram of debug circuitry configured to carry out debugging functions within a data processing system.

Referring to FIG. 3, there is provided a flowchart diagram configured in accordance with embodiments of the present invention. FIG. 3 is, in some respects, a flowchart diagram of steps and/or process blocks performed in accordance with embodiments of the present invention. FIG. 3 is, in other respects, a block diagram of debug circuitry 300 configured to carry out debugging functionality in a system, such as, but not limited to, the data processing system 100 illustrated in FIG. 1. FIGS. 11-15 described herein provide further details for the various functions of FIG. 3. Note that in embodiments of the present invention, the functions described with respect to FIGS. 3 and 11-15 may be performed by an external debug unit (not shown), or internally by any one or more hardware units (e.g., the HW IP modules 102a . . . 102n) and/or any one or more software units (e.g., the SW IP Tasks 160a . . . 160n), or by any other software/hardware implemented within the data processing system 100 (for example, by systems and methods implemented within the debug data memory 180).

Figure 23:
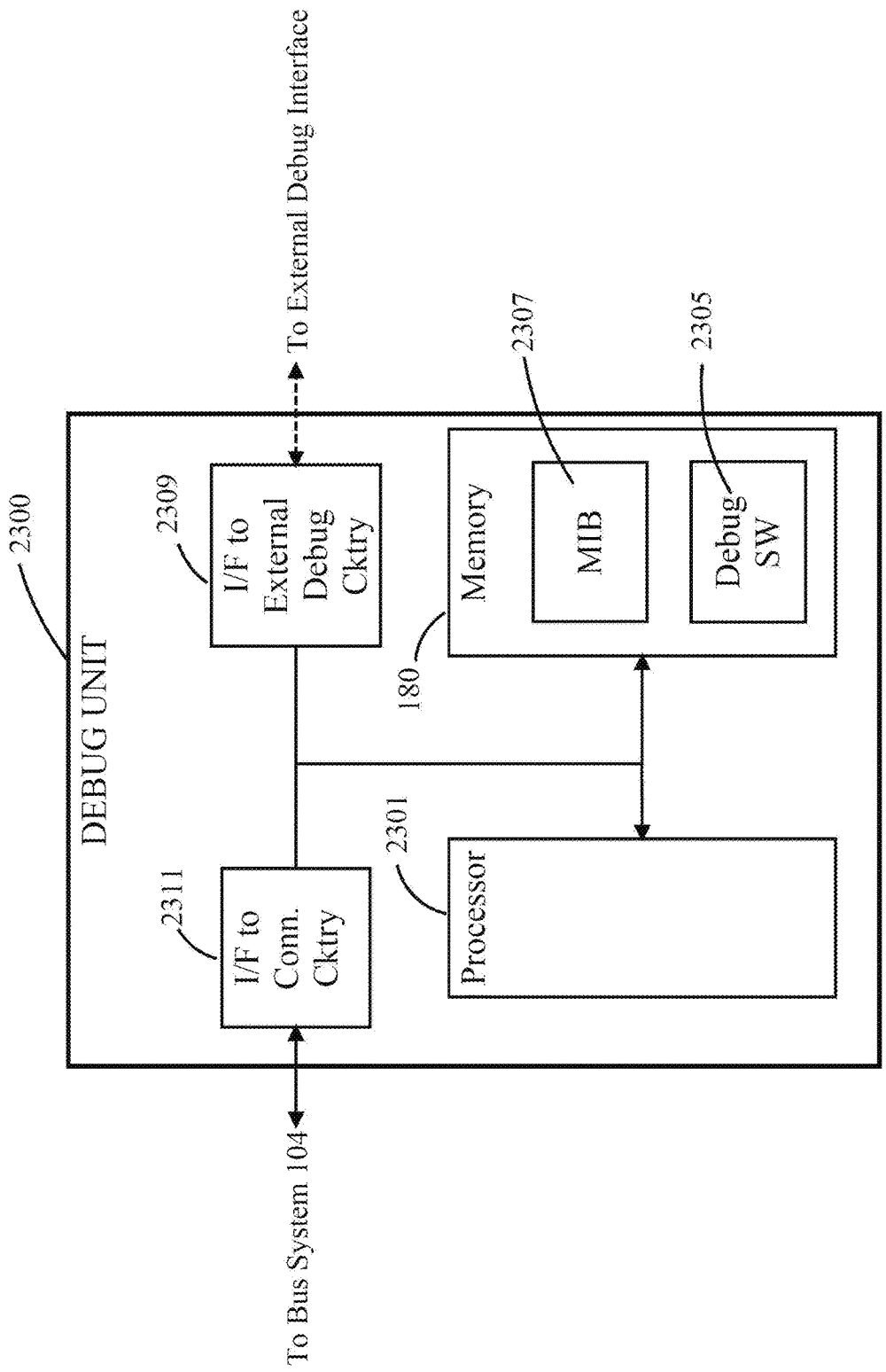
FIG. 23 illustrates an example of a debug unit that may be utilized within embodiments of the present invention.

Alternatively, referring to FIG. 23, the functions described with respect to FIGS. 3 and 11-15 may be performed by a debug unit 2300, which may be included within the data processing system 100. FIG. 23 illustrates a block diagram of such an exemplary debug unit 2300 configured in accordance with some embodiments of the present invention. In such embodiments, any one of the described elements (i.e., any one of the HW IP modules 102a . . . 102n and any one of the SW IP Tasks 160a . . . 160n, the system memory 170, the external connection unit 190, and the debug unit 2300) is capable of communicating with any other one of the above described elements by means of the interconnect circuitry 104. The debug unit 2300 can be configured to monitor activities taking place within the data processing system 100 by, in one respect, receiving information from one or more of the other elements within the data processing system 100, and sending information to the debug data memory 180. In this way, the debug unit 2300 can "sniff" activity that is taking place within the data processing system 100 and thereby collect debug information as described herein to be recorded in the debug data memory 180 for insertion within the memory information blocks described herein. Correspondingly, the debug unit 2300 may be configured to operate in accordance with the functions described herein with respect to FIGS. 3 and 11-15.

In accordance with some embodiments of the present invention, the debug data memory 180 may be implemented within such a debug unit 2300, whereby the collected debug information is recorded within MIB data records 2307 as further described herein. The exemplary debug unit 2300 may include a programmable processor 2301 that is bi-directionally coupled to the debug data memory 180. The debug data memory 180 may include a set of program instructions ("Debug SW") 2305 that, when executed by the processor 2301, cause the processor 2301 to carry out the functions specified by the program instructions 2305, which may include any or all of the debugging functions described herein with respect to FIGS. 3 and 11-15. In other embodiments, this data might be recorded in a separate unit, such as the debug data memory 180 as configured in FIG. 1. In other embodiments, it might not be recorded at all, but is instead supplied directly to an interface ("I/F") (e.g., a JTAG I/F) to external debug circuitry 2309 as soon as it is made available to the debug unit 2300 so that it may be delivered to external equipment (not shown). The interface to external debug circuitry 2309 may be bi-directionally coupled to the processor 2301 so that instructions and other debugging parameters can be received from the external equipment, and so that collected/generated debug information can be supplied to that external equipment. The debug unit 2300 may be capable of communicating with other system elements by means of the interconnect circuitry 104. Accordingly, the debug unit 2300 may further include an interface to the connection circuitry 2311. The interface to the connection circuitry 2311 may be bi-directionally coupled to the processor 2301. It will be appreciated that, in order to facilitate the description, the exemplary debug unit 2300 may be implemented by means of programmable circuitry. Notwithstanding this, other embodiments are also within the scope of the invention, such as completely hardwired embodiments, so long as they carry out the functionality described herein.

Referring again to FIG. 3, in the process block 301, the debug circuitry 300 receives information from one of the hardware and/or software units (e.g., the HW IP modules 102a . . . 102n and the SW IP Tasks 160a . . . 160n), such as those depicted in FIG. 1. The information may, for example, represent messages that have been sent from one of the hardware and/or software units via the interconnect circuitry 104 to another one of the foregoing units, and/or the system memory 170. In this way, the debug circuitry 300 is configured to monitor (e.g., "sniff") activity that is taking place within the data processing system 100, and thereby record debug information in the debug data memory 180, which can then be reported to external debug equipment.

That is, the monitored information can indicate what activities one or more of the hardware and/or software units are performing.

In some embodiments of the present invention, any one or more of the foregoing hardware and/or software units are configured to send at least some debug information (indicating what activities one or more of the hardware and/or software units are performing) to the system memory 170, and the system memory 170 (or logic circuitry associated with the system memory 170) is configured to forward the debug information to the debug circuitry 300. This can be an exclusive source of debug information for the debug circuitry 300, or can be in addition to other debug circuitries (not shown) monitoring activity as previously described.

The debug information monitored by the debug circuitry 300 can, but may not necessarily, include memory address parameters (e.g., a start address and size), to identify the location of data that has been written or read by one of the hardware and/or software units relative to the system memory 170. Because of this possibility, the debug circuitry 300 may be configured to determine whether the received information includes memory access parameters in the decision block 302, and thus whether a particular monitored activity pertains to a system memory 170 access.

If the received information includes system memory 170 accesses, then the debug circuitry 300 proceeds to the process block 303; otherwise, the debug circuitry 300 proceeds to the process block 304.

In accordance with the process block 303, embodiments of the present invention are configured so that when a hardware unit (e.g., any one or more of the HW IP module(s) 102a . . . 102n) executes a particular Operation, for each system memory 170 access initiated over the interconnect circuitry 104 by the HW IP module, the IP ID, INST ID, and BLOCK_SEQ information (values) are provided on the interconnect circuitry 104 by the HW IP module in addition to regular system memory access attributes (such as address ("Addr"), read ("RD"), write ("WR"), address size, etc.). And, embodiments of the present invention are configured so that when a software unit (e.g., any one or more of the SW IP Task(s) 160a, . . . 160n) executes a particular Operation, for each system memory 170 access initiated over the interconnect circuitry 104 by the SW IP Task, the IP ID, BLOCK_SEQ, and LBP information (values) are provided on the interconnect circuitry 104 in addition to regular system memory access attributes (such as address ("Addr"), read ("RD"), write ("WR"), address size, etc.).

While the regular system memory access attributes are used by a HW IP module to access the system memory 170, embodiments of the present invention are configured to implement the additional debug information associated with each system memory access by such a HW IP module (e.g., IP ID, INST ID, BLOCK_SEQ values), which is then recorded in the debug data memory 180 in a data record, referred to herein as a memory information block (abbreviated herein as "MIB") data record, which is further described herein with respect to FIG. 2. Additionally, while the regular system memory attributes are used by an Operation performed by a SW IP Task to access the system memory 170, embodiments of the present invention are configured to implement the additional debug information associated with each system memory access by such a SW IP Task (e.g., IP ID, BLOCK_SEQ, LBP values), which is then recorded in the debug data memory 180 in a MIB data record. Recording of such additional debug information associated with system memory accesses is further described herein with respect to FIGS. 3 and 11.

At some point, it is determined whether the collected debug information should be reported to external equipment (decision process block 304), and if so, then the debug circuitry 300 proceeds to the process block 305 to process the collected data. Otherwise, the debug circuitry 300 returns to the process block 301.

The process block 306 involves processing of information recorded in the MIB data records to identify and interlock (e.g., create linked relationships) input-output data dependencies within a given hardware unit (e.g., HW IP module) Operation or a given software unit (e.g., SW IP Task) Operation. (An example of such input-output data dependencies is described herein with respect to FIG. 4.) This process is referred to herein as Intra-Operation Dependency Chaining ("IAC"), which is further described with respect to FIG. 12. For example, a hardware unit Operation or a software unit Operation may read specific data from the system memory 170, process such data, and write specific output data (e.g., a result of the processing of the read data) back to the system memory 170. The output data thus written to the system memory 170 is thus implicitly dependent on the input data read from the system memory 170, and this data dependency is represented and interlocked using the IAC. Interlocking may be achieved by embodiments of the present invention by populating the Memory Read List ("MRL") and the Memory Write List ("MWL") fields of a MIB data record, which are further described herein with respect to FIG. 2.

The process block 307 is configured to process MIB data records to identify and interlock (e.g., create a linked relationship) input-output data dependencies between different hardware unit Operations and/or software unit Operations. This process is referred to herein as Inter-Operation Dependency Chaining ("IOC"), which is further described with respect to FIG. 13. For example, a HW IP module Operation may write data to the system memory 170, which is subsequently read by a downstream (i.e., subsequently executed) HW IP module Operation and/or SW IP Task Operation. This data dependency is represented and interlocked using the IOC. Interlocking may be achieved by embodiments of the present invention by populating the Consumer Linked List ("CLL") and the Producer Linked List ("PLL") fields of a MIB data record, which are further described with respect to FIG. 2.

The process block 309 is configured to trace hardware unit (e.g., HW IP module) and/or software unit (e.g., SW IP Task) data dependencies using the MIB data records, which have been updated following the procedures outlined in the process blocks 306-308. Such data dependency tracing is further described herein with respect to FIGS. 14-15.

Figure 4:
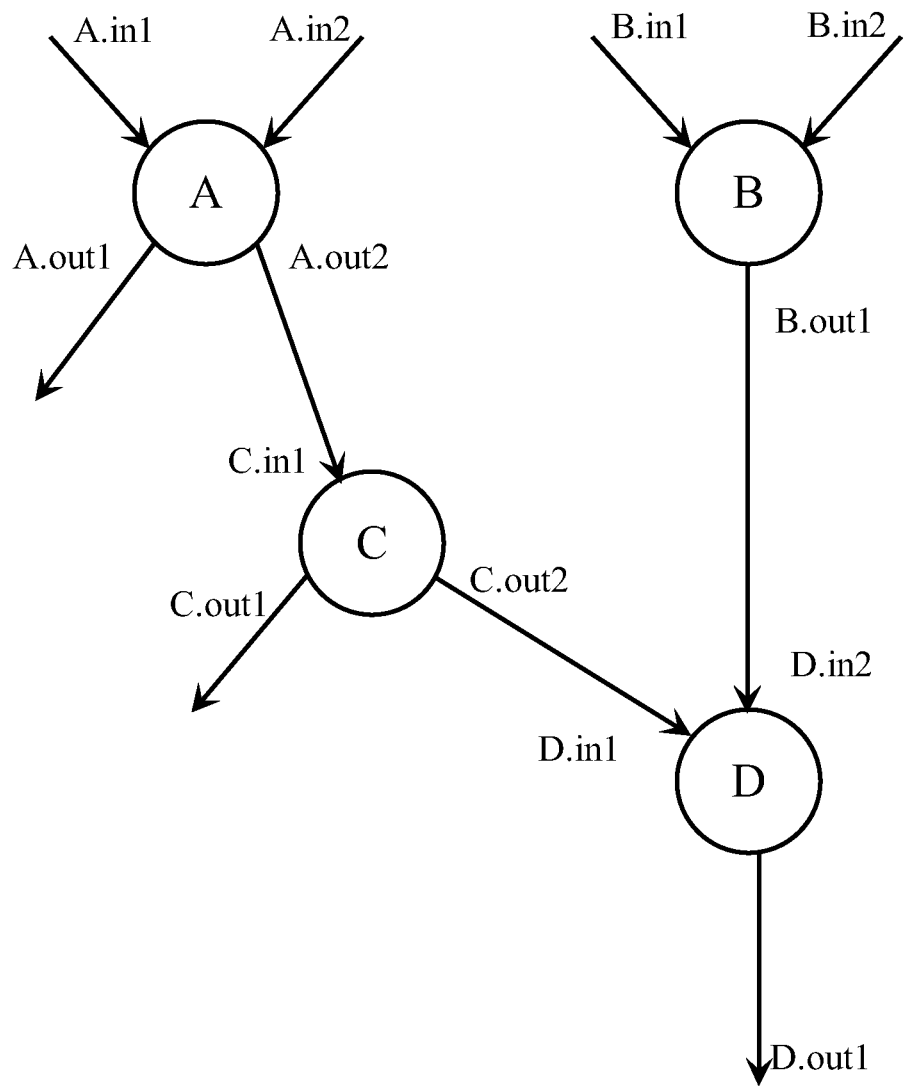
FIG. 4 illustrates an exemplary data dependency graph.

An example of such hardware unit and/or software unit data dependency tracing is illustrated using an exemplary data dependency graph as shown in FIG. 4. In this example, A, B, C, and D represent exemplary hardware unit and/or software unit Operations that may be performed within a data processing system (e.g., the data processing system 100). System memory data read as inputs by each Operation are indicated by ".in" edges. System memory data written as outputs by each Operation are indicated by ".out" edges. A Producer Operation may refer to an Operation that generates a result or side effect (e.g., data) on which following executed Consumer Operation(s) depend. The .out edge of a Producer Operation is common with the .in edge of the Consumer Operation, indicating that data is exchanged between Operations via the system memory, i.e., that the Consumer Operation reads data from the system memory location written to by the Producer Operation.

Producer Tracing is an example of hardware unit and/or software unit data dependency tracing based on upstream traversal of the data dependency graph of FIG. 4. Looking at the example in FIG. 4, the D.out1 output of the Operation D is produced based on inputs D.in1 and D.in2. D.in1 in turn is based on the C.out2 output of the Operation C, which in turn is based on its input C.in1, which can be ultimately further traced to the inputs A.in1 and A.in2. Similarly, the input D.in2 can be ultimately traced back to the inputs B.in1 and B.in2. In this example, an error observed at the output D.out1 can thus be traced back to upstream data exchanges (i.e., previously executed) to determine the exact root cause of the observed error.

Consumer Tracing is another example of hardware unit and/or software unit data dependency tracing based on downstream traversal of the data dependency graph of FIG. 4. From the example above, it can be seen via Consumer Tracing that the input A.in1 of the Operation A impacts outputs of the Operations C and D.

Referring to FIG. 2, as previously disclosed, the debug data memory 180 is configured to implement and record memory information block data records, referred to herein as MIB data records, which are utilized to record certain information (as disclosed herein) pertaining to data read-as-input from the system memory 170 and data written-as-output to the system memory 170 during each Operation performed by a hardware unit (e.g., the HW IP modules 106a . . . 106n) or a software unit (e.g., the SW IP Tasks 106a . . . 106n).

As previously noted, a single HW IP module Operation may generate multiple read/write accesses to the system memory 170, with each such instance of a system memory access recorded in a separate MIB data record. Similarly, for each SW IP Task Operation, each instance of a read/write access to the system memory 170 resulting from an execution of a LOAD or STORE instruction maps to a separate MIB data record. Note that recording of information into a MIB data record may be started or stopped based on one or more specific event(s) occurring in the data processing system 100. Further, recording of information into a MIB data record may be conditional to initiation of a system memory access from a specific set of IP or specific to other attributes of the access to the system memory 170.

Referring again to FIG. 2, the following describes data fields (also referred to herein as simply "fields") that may be implemented in each MIB data record (identified as MIB-ID) for the recording of information pertaining to each instance of data read from the system memory 170 and data written to the system memory 170 by a hardware unit (e.g., the HW IP modules 106a . . . 106n) or a software unit (e.g., the SW IP Tasks 106a . . . 106n). These fields may be populated with the values described herein as a result of the monitoring of system memory accesses on the interconnect circuitry 104 by the debug data memory 180, the debug circuitry 300, or some form of a debug unit as described herein (e.g., the debug unit 2300).

IP Type: Accesses (i.e., a READ ("RD") or WRITE ("WR")) to the system memory 170 initiated by HW IP module Operations have this field set to a value of "HW" (such system memory 170 accesses are also denoted herein as "IP Type=HW"). For example, for each system memory access transmitted on the interconnect circuitry 104, the debug data memory 180 may be configured to set the value of the IP Type field to "HW" in a MIB data record upon detection that the system memory access includes an IP ID of one of the HW IP modules (e.g., IP1, IP2, etc.; see FIG. 1). Accesses (i.e., a READ or WRITE) to the system memory 170 initiated by SW IP Task Operations have this field set to a value of "SW" (such system memory 170 accesses are also denoted herein as "IP Type=SW"). For example, for each system memory access transmitted on the interconnect circuitry 104, the debug data memory 180 may be configured to set the value of the IP Type field to "SW" in a MIB data record upon detection that the system memory access includes an IP ID of one of the SW IP Tasks (e.g., T1, T2, etc.; see FIG. 1).

Access Type: Read accesses to the system memory 170 (i.e., READ instructions) by a HW IP module or a SW IP Task set this field in the MIB data records with a value of "RD" (also denoted herein as "Access Type=RD"). Write accesses to the system memory 170 (i.e., WRITE instructions) by a HW IP module or a SW IP Task set this field in the MIB data records with a value of "WR" (also denoted herein as "Access Type=WR").

IP ID: For each instruction initiated by a particular HW IP module, the IP ID field in a MIB data record may be set with a unique identifier pertaining to that particular HW IP module, e.g., a predefined integer value (e.g., IP1, IP2, etc.; see FIG. 1). For each instruction initiated by a particular SW IP Task, the IP ID field may be set with a concatenation of any one or more of the following information: a virtual address of the instruction, a physical address of the instruction, a Processor ID identifying the GPP (e.g., GPP 130) on which the instruction executed (for example, a "CPU-ID" such as CPU0, CPU1, etc.), and/or a Process ID ("PID") of the process encompassing the instruction (e.g., T1, T2, etc.; see FIG. 1). A Process ID is a unique process identifier allocated by an operating system, which may be recorded in a PID register available in some processors. The IP-ID value may include a PID identifier, as for example: IP-ID={virtual address of instruction, physical address of the instruction, CPU-ID on which the instruction is executing, and PID of the process}.

INST ID (Instance ID): This field is configured to provide a unique identifier for the MIB data records so as to indicate that an access to the system memory 170 belongs to a particular occurrence (e.g., instruction) of a particular HW IP module Operation (e.g., see INST ID 110 of FIG. 1). This may be used to take care of the case where multiple HW IP module Operations are in flight concurrently on the interconnect circuitry 104, so as to be able to correctly associate the system memory access(es) pertaining to a particular HW IP module Operation. For each HW IP module, the INST ID may be maintained by a counter in the HW IP module that increments at the start of each new Operation commenced by the HW IP module. Each HW IP module tracks system memory accesses pertaining to specific instances (e.g., instructions) of an Operation, and provides onto the interconnect circuitry 104 the appropriate INST ID assigned to each Operation for each MIB data record associated with that Operation. For SW IP Task Operations, a system memory access pertaining to a specific SW IP Task Operation is identified through a data record referred to herein as a Load Block Pointer ("LBP"), as described in further detail herein. Consequently, within embodiments of the present invention, the INST ID is not a relevant field for MIB data records pertaining to SW IP Task Operations.

BLOCK_SEQ: This field is utilized to mark the START and END of a HW IP module Operation across the multiplicity of system memory accesses pertaining to that Operation. Thus, for IP Type=HW, the first created MIB data record pertaining to an instruction performed by a HW IP module Operation will mark this field with a value of "START"; the last created MIB data record pertaining to an instruction performed by that HW IP module Operation will mark this field with a value of "END," and any other created MIB data record(s) pertaining to that HW IP module Operation may mark this field with a NULL value. NULL values may be denoted in the figures as a "-" for the sake of simplicity. Similar to the INST ID value, each HW IP module is aware of and provides a correct BLOCK_SEQ field value (i.e., START, END, NULL) for each system memory access associated with each HW IP module Operation. For HW IP module Operations, this field is utilized in the IAC procedure described herein. For Operations performed by a software unit (e.g., a SW IP Task), embodiments of the present invention are configured so that with all instructions in which data is written to the system memory 170 (STORE instructions), a BLOCK_SEQ value of END is transmitted onto the interconnect circuitry 104 (which is recorded in the appropriate MIB data record), while with all instructions in which data is read from the system memory 170 (LOAD instructions), a BLOCK_SEQ value of NULL may be transmitted onto the interconnect circuitry 104. The logic to handle production of such BLOCK_SEQ values may be implemented in the GPP/bus interface design. As a result, for IP Type=SW and Access Type=WR, this field in a MIB data record is marked with a value of "END," while all other MIB data records pertaining to SW IP Task Operations may mark this field with a NULL value.

BLOCK_SEQ_END ("BSE"): For MIB data records associated with a particular Operation, this field is configured to be set to point to that particular Operation's MIB data record having its BLOCK_SEQ field marked with a value of "END." The BSE field may be marked with a NULL value to begin with, and then populated as further described herein with respect to FIG. 12. Note that, for SW IP Task Operations, the MIB data record with Access Type=RD may be part of multiple SW IP Task Operations (since data read from the system memory 170 that is loaded into a register of the Data Bank 141 via a LOAD instruction may impact multiple registers of the Data. Bank 141 that subsequently may be the source of multiple system memory write instructions via STORE instructions). Hence, the BSE field for an MIB data record with an IP Type=SW, and without loss of generality, even for an IP Type=HW, may be implemented as a list, where each element points to a unique Operation's MIB data record having its BLOCK_SEQ field marked with a value of "END."

Addr: This field is configured to be set with the address of the system memory 170 access pertaining to the instruction recorded by each MIB data record.

Size: This field is configured to be set with the size of the system memory 170 access pertaining to the instruction recorded by each MIB data record.

Data/Metadata: These are optional fields (not shown), which may be implemented to maintain (record) a reference to the data written or read by an instruction, and/or information about the data, such as what the data represents.

Load Block Pointer ("LBP"): This field is relevant for MIB data records with IP Type=SW and an Access Type=WR, i.e., for software STORE instructions performed by a SW IP Task (e.g., see the process blocks 1103-1106 of FIG. 11). This field is derived from data records in the Register Load Map ("RLM") entries in the RLM Bank 140 in each GPP (e.g., GPP 130). Specifically, this field is configured to identify a Load Block ("LB") entry in the LB 150 as further discussed herein with respect to FIG. 10, which is populated using the RLM Bank 140 entries of the GPR Bank 151, which provides the data that is written to the system memory 170 by STORE instructions. The LB entry in the LB 150 that is provided for the LBP field may be provided by the software unit onto the interconnect circuitry 104, which is monitored by the debug data memory 180. The LBP field is also further discussed herein with respect to FIG. 10.

Consumer Link List ("CLL"): This field is utilized in MIB data records with an Access Type=WR in order to provide links to MIB data records representing instructions that "Consume" (i.e., read) data generated by a particular instruction pertaining to a MIB data record, in part or in full. The CLL field may be configured as a list of special data records, each referred to as a CL_INFO_BLK ("CIB"). Each CIB may include the following sub-fields: Addr, Size, and CL_PTR. Since there can be multiple Consumers (i.e., instructions) of the data, the CIB sub-fields may be, for purposes of illustration, configured as follows:

Number of CM Elements (NUM_CIB)
CIB1: {Addr1, Size1, CL1_PTR} . . . CIB<N>: {Addr<N>, Size<N>, CL<N>_PTR}, wherein N is a positive integer.

Figure 13:
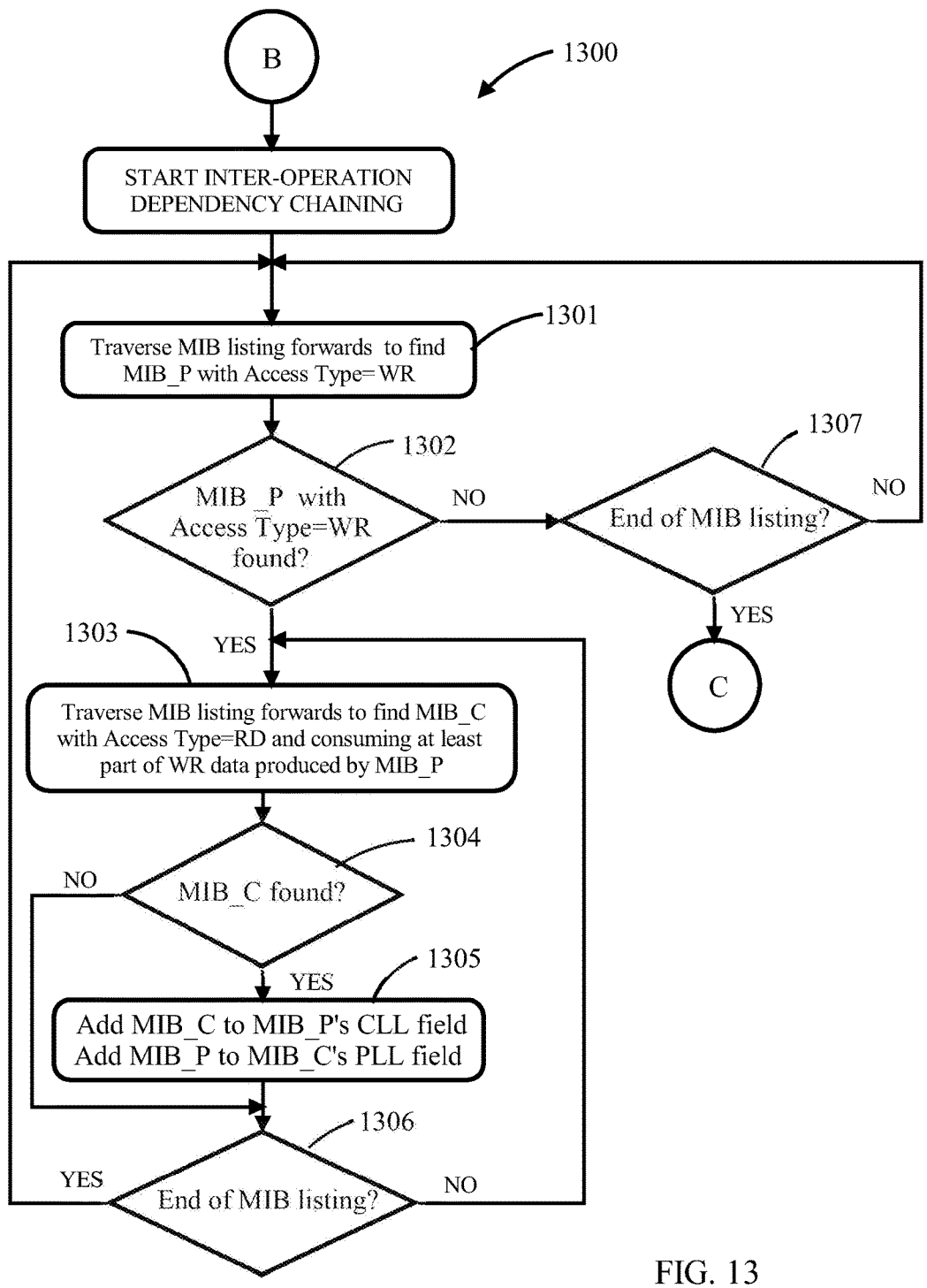
FIG. 13 illustrates a flowchart diagram of Inter-Operation Dependency Chaining.

The CL_PTR pointer may be configured to be marked with a NULL value to begin with, and will then be populated as part of the Inter-Operation Dependency Chaining described herein with respect to FIG. 13. A reason for such Addr and Size sub-fields in the CIB is to take care of a situation where a Consumer consumes a subset of the data pointed to by this MIB data record. (A Consumer may refer to an instruction that depends on the result or side effect (e.g., data) of a previously executed instruction.) This could be due to either the Consumer consuming a smaller data size than that is pointed to by the MIB data record, or due to the fact that a portion of the data consumed is in fact generated (written) by a following instruction (represented by a MIB data record). The Addr and Size sub-fields of the CIB may be configured to identify the exact data that is consumed so that subsequent debug tracing can be more easily performed. Note that the CLL field may be marked with a NULL value for a MIB data record with an Access Type=RD.

Producer Link List ("PLL"): This field is utilized in MIB data records with an Access Type=RD. The PLL field may be configured as an array or list of special data records, each referred to herein as a PL_INFO_BLK ("PIB"), each of which may be configured to include the following sub-fields: Addr, Size, and PL_PTR. For purposes of illustration, the PIB sub-fields may be configured as follows:

Number of PIB Elements (NUM_PIB)
PIB1: {Addr1, Size1, PL1_PTR} . . . PIB<N>: {Addr<N>, Size<N>, PL<N>_PTR}, wherein N is a positive integer.

The PL_PTR pointer may be configured to be marked with a NULL value to begin with, and will be populated as part of Inter-Operation Dependency Chaining, which is further described herein with respect to FIG. 13, to point to a MIB data record pertaining to a Producer of the input data that this MIB data record represents. (A Producer may refer to an instruction that generates a result or side effect (e.g., writes data) on which following executed instruction(s) (i.e., Consumer(s)) depend.) Note that it is possible that in such a PL_PTR linking process, a single Producer (instruction) does not produce all the input data, which is why the PLL field may be configured as a list.

Memory Read List ("MRL"): This field is utilized in MIB data records with their BLOCK_SEQ fields marked with values of "END," i.e., for MIB data records that represent the last system memory access of an Operation. The MRL field may be configured to point to a linked list and/or array of pointers to MIB data records that represent read instructions to the system memory 170 that are consumed as inputs by this Operation. The MRL field may be marked with a NULL value to begin with, and is populated as part of Intra-Operation Dependency Chaining ("IAC") described herein with respect to FIG. 12.

Memory Write List ("MWL"): This field pertains to last system memory accesses, i.e., the MIB data records with their BLOCK_SEQ fields marked with values of "END." The MWL field may be configured to point to a linked list and/or array of pointers to MIB data records that represent write instructions to the system memory 170 that are produced as outputs by this Operation. The MWL field may be configured to be marked with a NULL value to begin with, and is then populated as part of IAC described herein with respect to FIG. 12. Note that, a MIB data record with its BLOCK_SEQ field marked with a value of "END" is implicitly a part of this list if it is of an Access Type=WR.

As noted, the MRL and MWL fields may be configured as an array or linked list, or any equivalent data records, where each entry points to a MIB data record.

The following description provides more details of the recording of system memory accesses initiated by each hardware unit (e.g., a HW IP module) Operation and software unit (e.g., a SW IP Task) Operation, corresponding to the process blocks 301-303 described herein with respect to FIG. 3.

Figure 11:
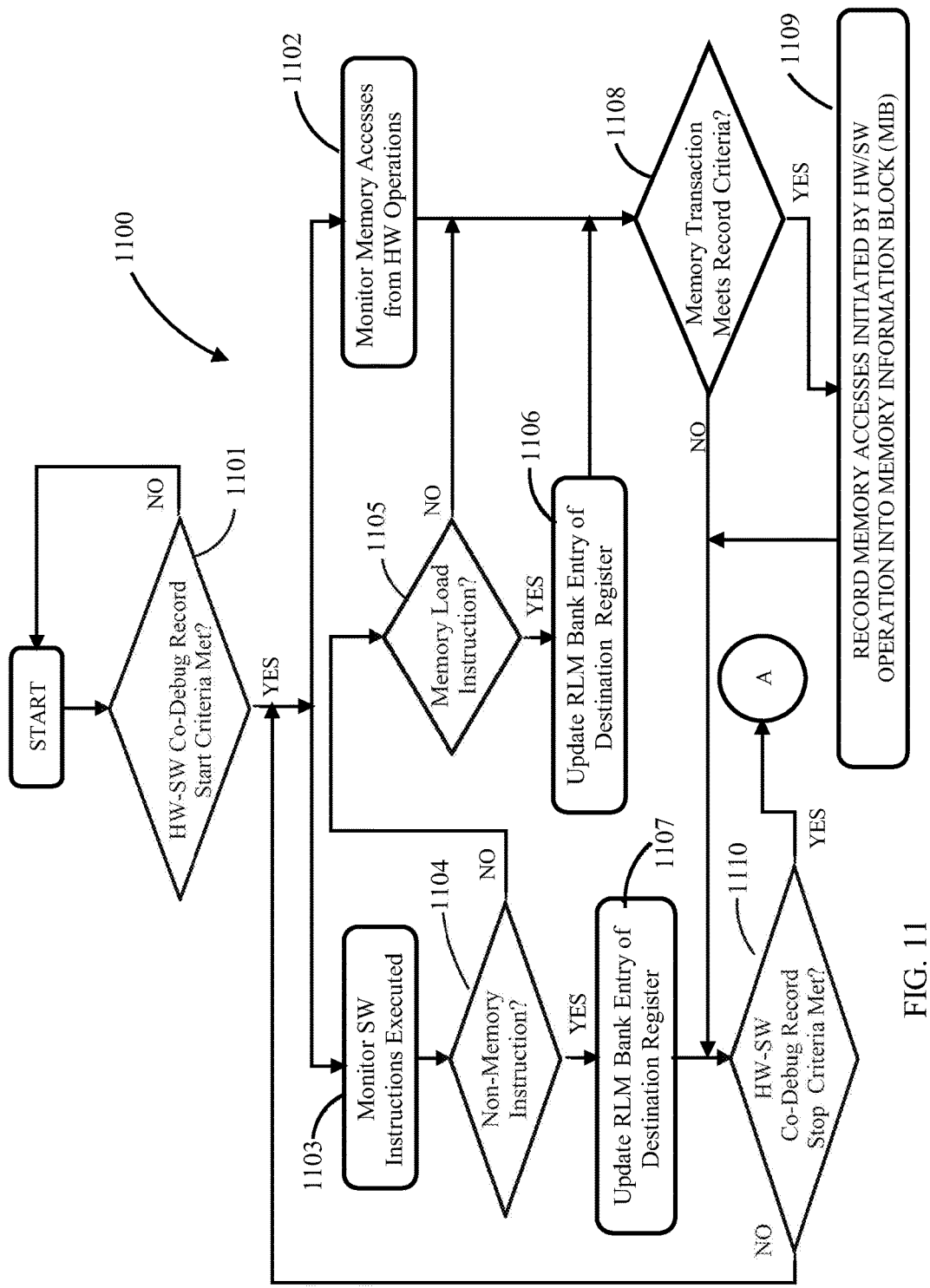
FIG. 11 illustrates a flowchart diagram for recording system memory accesses of Operations.

FIG. 11 illustrates a system and method 1100 for recording system memory accesses of each Operation into the MIB data records within the debug data memory 180. The system and method 1100 begins with the process block 1101 in which it determines whether predetermined criteria have been met. Such predetermined criteria can be an occurrence of any event based on user-specified criteria for determining when to start recording system memory accesses. Non-limiting examples include software breakpoints or watchpoints, cycle or instruction counts, a specified address range for a memory access, etc. As previously noted with respect to the process block 301 in FIG. 3, the system and method 1100 will, in the process block 1103, begin to monitor instructions executed by software unit Operations within the data processing system 100, and will, in the process block 1103, monitor system memory accesses from hardware unit Operations in the data processing system 100.

With respect to the monitoring of system memory accesses from hardware unit Operations by the process block 1102, if such a hardware unit Operation conducts a system memory access (e.g., read or write to the system memory 170) that meets predetermined recording criteria as determined by the process block 1108, then such a system memory access will be recorded into a MIB data record in the process block 1109 (for example, by the data debug memory 180 in response to its monitoring of system memory accesses on the interconnect circuitry 104). Otherwise, the system and method 1100 proceeds to the process block 1110.

For software unit instructions (executed within the data processing system 100) monitored in the process block 1103, the system and method 1100 determines in the process block 1104 whether a particular executed software unit instruction involves a system memory access. If it does, then the system and method 1100 proceeds to the process block 1105. The process block 1105 determines whether such a system memory access pertains to a LOAD instruction. If not (i.e., the transaction pertains to a STORE instruction), then the system and method 1100 proceeds to the process block 1108. The process block 1108 will then determine whether the STORE instruction of the monitored software unit instruction meets predetermined recording criteria for recording the system memory access into a MIB data record in the process block 1109. Such predetermined criteria can be an occurrence of any event based on user-specified criteria for determining when to start recording system memory accesses. Non-limiting examples include software breakpoints or watchpoints, cycle or instruction counts, a specified address range for a system memory access, etc.

If in the process block 1105, it has been determined that the monitored software unit instruction does involve a LOAD instruction, then the system and method 1100 proceeds to the process block 1106 to update the RLM Bank 140 entry of the destination register in the Data Bank 141. This would involve updating an entry in the RLM Bank 140 corresponding to the register within the Data Bank 141 of the GPR Bank 151 into which the data read from the system memory 170 is loaded. Examples of such updates are discussed herein with respect to FIGS. 5-8. Subsequently, the system and method 1100 continues to process this LOAD instruction within the process blocks 1108-1109.

If in the process block 1104, it is determined that the monitored executed software unit instruction has not involved a system memory access, then in the process block 1107, the RLM Bank entry of the destination register in the Data Bank 141 is updated, as similarly described with respect to the process block 1106. Examples of such updates are discussed herein with respect to FIGS. 5-8. After the process block 1107, the system and method 1100 proceeds to the process block 1110. Since a system memory access was not involved with this particular monitored executed software unit instruction, the recording of information into an MIB data record is not performed by the process blocks 1108-1109.

In the process block 1110, the system and method 1100 determines whether predetermined criteria for the stopping of the recording of system memory accesses have been met. Such predetermined criteria can be an occurrence of any event based on user-specified criteria for determining when to start recording system memory accesses. Non-limiting examples include software breakpoints or watchpoints, cycle or instruction counts, a specified address range for a memory access, etc. If the stop criteria have not been met, then the system and method 1100 returns to the process blocks 1102-1103 to continue to monitor the hardware unit and software unit transactions within the data processing system 100. However, if the stop criteria have been met, then embodiments of the present invention may proceed to process data collected within the MIB data records as previously noted within respect to the process block 305 in FIG. 3. Within embodiments of the present invention, this may include proceeding to the process block 306 for performing IAC, which is further described herein with respect to FIG. 12, and/or the process block 307 for performing IOC, which is further described herein with respect to FIG. 13.

Figure 5:
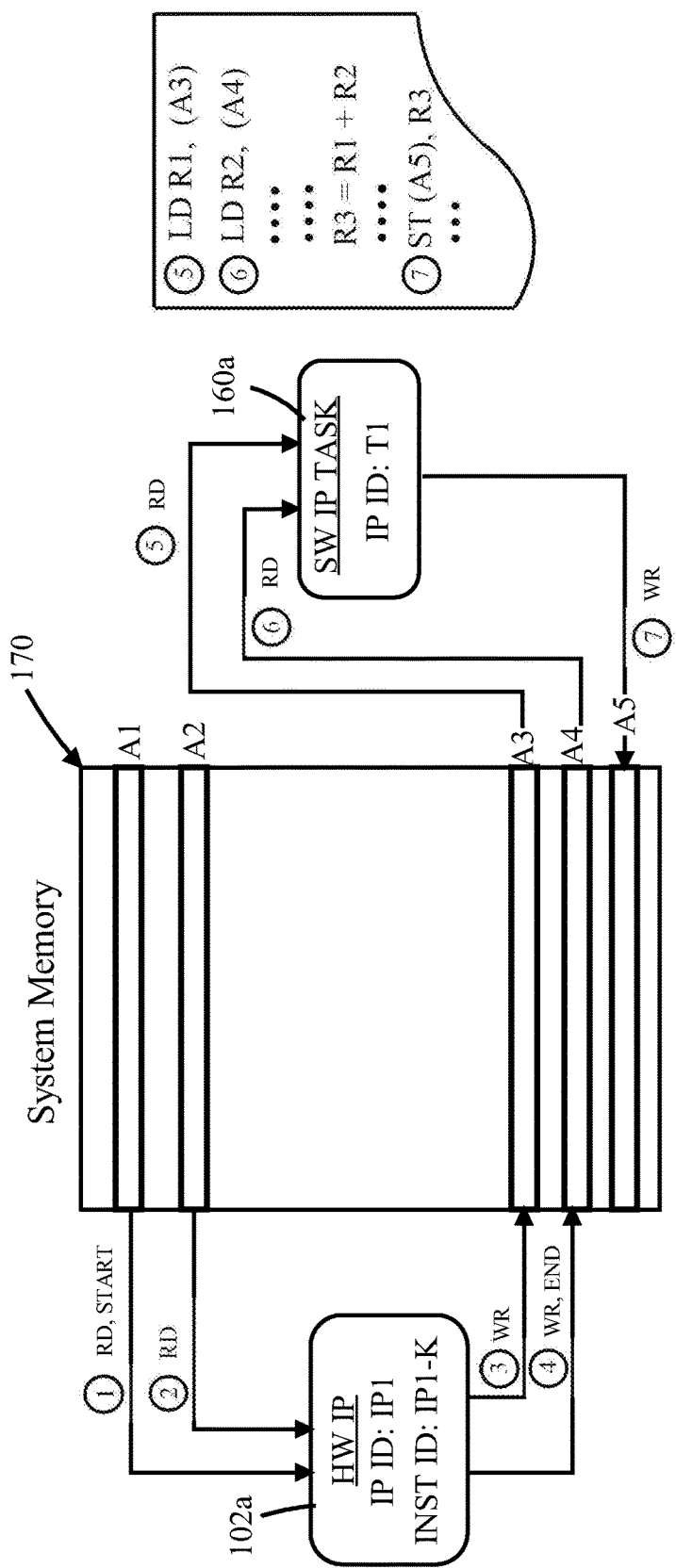
FIG. 5 illustrates examples of Operations performed by hardware and software units in accordance with embodiments of the present invention.
Figure 6:
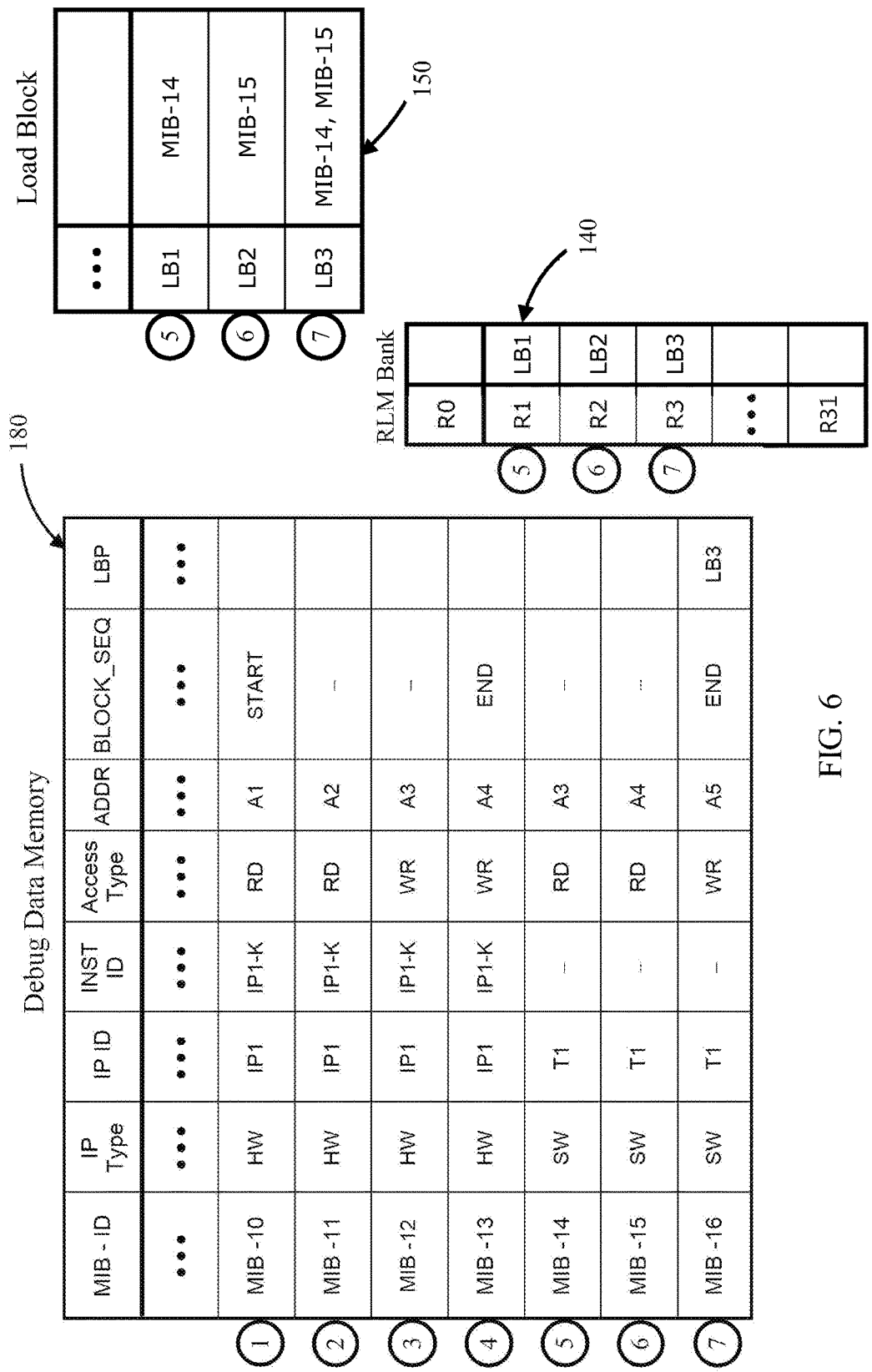

FIGS. 5-6 illustrate examples of the recording of system memory accesses as MIB data records in a debug data memory 180 in accordance with the system and method 1100 of FIG. 11. Note that in FIG. 6, not all of the MIB data record fields are shown as illustrated in FIG. 2 for the sake of simplicity.

FIG. 5 illustrates an example of a HW IP module 102a (designated with an IP ID of IP1) execution of an Operation (designated by the HW IP module 102a with an INST ID of IP1-K) with two READ ("RD") instructions of data from the system memory 170 addresses A1 and A2 (labeled as ① and ② in FIG. 5), and two WRITE ("WR") instructions of data to the system memory 170 addresses A3 and A4 (labeled as ③ and ④ in FIG. 5).

Referring to FIG. 6, these system memory accesses are recorded in the exemplary MIB data records 10-13 (the MIB data records identified ("ID") as MIB-10, MIB-11, MIB-12, and MIB-13) in the debug data memory 180. Note that the MIB data record MIB-10 representing the first system memory access by the IP1 Operation IP1-K, has its BLOCK_SEQ field set to a value of "START"; and, the MIB data record MIB-13, representing the last system memory access, has its BLOCK_SEQ field set to a value of "END."

FIG. 5 also illustrates an example of a SW IP Task 160a (designated with an IP ID of T1) with two READ ("RD") instructions of data from the system memory 170 addresses A3 and A4 (labeled as ⑤ and ⑥ in FIG. 5), and one WRITE ("WR") instruction of data to the system memory 170 address A5 (labeled as ⑦ in FIG. 5).

Referring to FIG. 6, in accordance with this example, these system memory accesses are recorded in the MIB data records identified ("ID") as MIB-14, MIB-15, and MIB-16 in the debug data memory 180. Note that while in this example these MIB data records are shown as representing consecutive system memory accesses, other HW IP module Operations (e.g., IP ID of IP2 and INST ID of IP2-J) and/or SW IP Task Operations (e.g., IP ID of T2) (not shown) may be interspersed with these.

FIG. 5 also shows that the READ instruction ⑤ by the SW IP Task 160a corresponds to a LOAD ("LD") instruction that loads data from the system memory 170 address A3 into the register R1 of the Data Bank 141. As previously described with respect to the process block 1106 of FIG. 11, since the register R1 (i.e., the destination register in the Data Bank 141) is written using data from the system memory READ ("RD") instruction ⑤ (corresponding to the MIB data record MIB-14), FIG. 6 shows that the RLM Bank 140 entry for the register R1 is populated (updated) with a pointer to the LB1 entry of the LB 150, which is populated with a pointer to the MIB data record MIB-14. Similarly, the READ ("RD") instruction ⑥ by the SW IP Task 160a (corresponding to the MIB data record MIB-15) loads the register R2 (i.e., the destination register in the Data Bank 141) of the Data Bank 141 and populates (updates) the RLM Bank 140 entry for the register R2 with a pointer to the LB 150 entry LB2, which in turn is populated with a pointer to the MIB data record MIB-15. Since the data in the register R3 of the Data Bank 140 is computed (in this example as shown in FIG. 5) using the data in the registers R1 and R2, the value of the register R3 is dependent on the READ instructions ⑤ and ⑥ from the system memory 170. Hence, the RLM Bank 140 entry corresponding to the register R3 in FIG. 6 is updated to point to the LB 150 entry LB3, which in turn points to a list of the MIB data records MIB-14 and MIB-15 (see the process block 1107 of FIG. 11). And, in this example, the WRITE ("WR") instruction ⑦ by the SW IP Task 160a (corresponding to the MIB data record MIB-16) represents a STORE instruction using the register R3 as the source of data. Note that the MIB data record MIB-16 in FIG. 6 has the BLOCK_SEQ field marked with a value of "END," and the LBP field set with entry "LB3" accordance with the current snapshot of the RLM Bank 140 entry corresponding to the register R3 of the Data Bank 141 (see the NO path exiting from the process block 1105 of FIG. 11).

Intra-Operation Dependency Chaining ("IAC")

Figure 12:
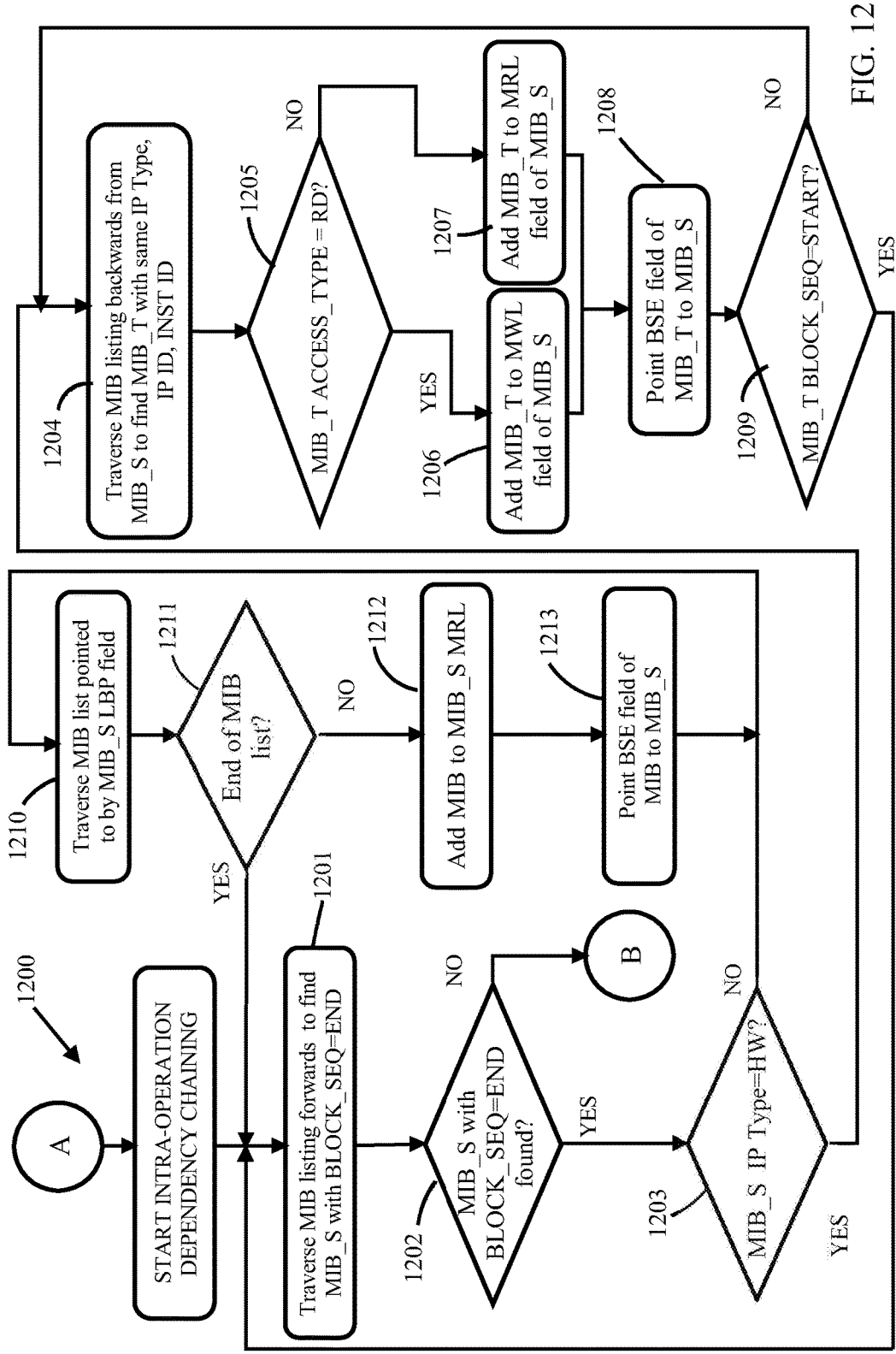
FIG. 12 illustrates a flowchart diagram of Intra-Operation Dependency Chaining.

The following describes in more detail the LAC corresponding to the process block 306 of FIG. 3, which is further described herein with respect to FIG. 12. The IAC chains, or interlocks, data dependencies within a hardware unit (e.g., a HW IP module) Operation or a software unit (e.g., a SW IP Task) Operation, i.e., creates linked relationships of input data consumed via system memory READ instructions (i.e., a MIB data record having an Access Type=RD), and data output via system memory WRITE instructions (i.e., a MIB data record having an Access Type=WR), for a given HW IP module Operation or SW IP Task Operation. Embodiments of the present invention are configured to accomplish this by populating the MRL and MWL fields of the MIB data records having their BLOCK_SEQ fields marked with values of END, also referred to herein as a Source-MIB data records. The MIB data records linked to a Source-MIB data record via the IAC will also be referred to herein as Target-MIB data records. The procedures for accomplishing this for HW IP module Operations and SW IP Task Operations are different as described herein with respect to FIG. 12.

IAC for a HW IP Module Operation

Each MIB data record including and bounded between the MIB data records with their BLOCK_SEQ fields marked with the values of START and END, and having an Access Type=RD and having the same IP Type, IP ID, and INST_ID as captured in a Target-MIB data record, is added to the list pointed to by the MRL field. Similarly, the MIB data records with an Access Type=WR are added to the list pointed to by the MWL field. Alongside populating the MRL and MWL fields, the BSE field of a Source-MIB data record is made to point to the Target-MIB data record.

More specifically, referring to FIG. 12, the IAC begins in the process block 1201 to traverse forwards through the listing of MIB data records until it encounters an MIB data record with its BLOCK_SEQ field marked with the value of "END" (designated in FIG. 12 as MIB_S). If, in the process block 1202, there are no such MIB data records with the BLOCK_SEQ field marked with the value of "END," processing may then be handed over to the Inter-Operation Dependency Chaining process as described with respect to FIG. 13. However, if an MIB data record (MIB_S) is found with its BLOCK_SEQ field marked with the value of "END," then the system and method 1200 proceeds to the process block 1203 to determine if the MIB data record. MIB_S has an IP Type marking it as pertaining to a hardware ("HW") Operation (IP type=HW). If the response to the determination within the process block 1203 is YES, then the system and method 1200 proceeds to the process block 1204 to traverse backwards through the listing of MIB data records from the MIB data record MIB_S (i.e., the MIB data record found in the process block 1201) to find the next MIB data record having the same IP Type, IP ID, and INST ID (identified in FIG. 12 as MIB_T). The system and method 1200 will then determine whether such a found MIB data record (MIB_T) has an Access Type=RD (i.e., the MIB data record represents a READ instruction performed by a hardware unit). If the response to the determination within the process block 1205 is YES, the system and method 1200 proceeds to the process block 1206 to insert the identification of the MIB data record MIB_T into the MRL field of the MIB data record MIB_S. If in the process block 1205, the Access Type was not a READ instruction, but instead a WRITE instruction, then the system and method 1200 proceeds to the process block 1207 to insert an identification of the MIB data record MIB_T into the MWL field of the MIB data record MIB_S.

Referring to the example illustrated in FIGS. 5 and 7, the MIB listing was traversed forwards by the system and method 1200 until it reached the MIB data record MIB-13 (an entry pertaining to an instruction associated with the HW IP module with IP ID of IP1 having BLOCK_SEQ=END), and then traversed backwards through the MIB listing to find the MIB data records with an Access Type=RD (i.e., MIB-10, MIB-11), whereby pointers to these two MIB data records were inserted into the MRL field of the MIB data record MIB-13. Additionally, in accordance with the process block 1207, a pointer to the MIB data record MIB-12 was inserted into the MWL field of the MIB data record MIB-13.

Regardless of which of the process blocks 1206 and 1207 have been performed, the system and method 1200 will proceed next to the process block 1208 to insert a pointer to the MIB data record MIB_S into the BSE field of the MIB data record MIB_T. Thereafter, in the process block 1209, it is determined whether the MIB data record MIB_T has its BLOCK_SEQ field marked with the value of "START." If not, the system and method 1200 returns to the process block 1204 to continue to traverse backwards through the listing of MIB data records from the MIB data record MIB_S. However, if the response to the determination within the process block 1209 is YES, then the system and method 1200 returns to the process block 1201.

IAC for a SW IP Task Operation

For SW IP Task Operations, execution of a STORE instruction is a singular system memory access of an Access Type=WR. Hence, the MWL field essentially is implicitly the MIB data record associated with the STORE instruction, and nothing extra may be performed for building the MWL field, which may continue to be marked with a NULL value (e.g., see the MIB data record MIB-16 in FIG. 7). In order to populate the MRL field, all LOAD instructions by a SW IP Task Operation are identified and linked, since they impact the results (data) being written to the system memory 170 via the SW IP Task Operation using the STORE instruction. This in effect also identifies all MIB data records that represent that Operation (e.g., referring to FIG. 5, the RD instructions ⑤ and ⑥ impact the WR instruction ⑦). And, since such a STORE instruction eventually makes use of data residing in the architected general purpose registers in the Data Bank 141 of the GPR Bank 151 of the GPP 130, the above can be accomplished using a mechanism that tracks all LOAD instructions that impact the data stored in each architected general purpose register in the Data Bank 141 at a given point in time. As previously described, the RLM Bank 140 may be utilized for this purpose. As such, the RLM Bank 140 may be configured to have an entry associated with each register in the Data Bank 141 of the GPR Bank 151, which additionally points to a linked list or array of elements referred to herein as the Load Block ("LB") 150 (previously described with respect to FIG. 1), where each LB 150 entry can be populated with pointer(s) to a list of one or more MIB data records with an Access Type=RD that have directly or indirectly impacted the result (data) that is residing in the corresponding registers in the Data Bank 141 of the GPR Bank 151 at that point in time. Such a list of one or more MIB data records may be supplied to the LB 150 in the response returned from the debug data memory 180. Each entry of the LB 150 may also include a reference count ("REF_CNT") field to indicate the number of additional RLM Bank 140 entries that are referring to this LB 150 entry. The REF_CNT fields may be implemented with each entry of the LB 150, in accordance with embodiments of the present invention.

Embodiments of the present invention may be configured with the following procedure to create a RLM Bank 140 entry for a specific register in the Data Bank 141. Note that a specific register in the Data Bank 141 whose corresponding RLM Bank 140 entry is being populated is also referred to herein as a Destination Register; the other registers in the Data Bank 141 are referred to as Source Registers in this situation.

If the Destination Register is written to (i.e., not updated, where update means that the new value of the Destination Register is based on its present value) using a LOAD instruction, then the RLM Bank 140 entry for a Destination Register is made to point to a newly created (by embodiments of the present invention) LB 150 entry, which points to the MIB data record corresponding to this LOAD instruction (e.g., see the process block 1106 of FIG. 11). This may be accomplished by embodiments of the present invention e.g., the debug circuitry 300) transferring the appropriate information from the debug data memory 180 to the LB 150 and the RLM Bank 140. The REF_CNT fields of the LB 150 entries that were previously pointed to by a Destination Register's RLM 140 entry are decremented. Following this, if the REF_CNT field of any of the LB 150 entries has a value of "0," then that LB 150 entry is released and/or deleted (cleared) when it is to be decremented. However, for LB 150 entries whose REF_CNT field does not have value of "0," those LB 150 entries are not deleted, but are merely decremented.

If the Destination Register is written (i.e., not updated) by a software unit computation involving a set of Source Registers (i.e., not involving a system memory 170 access), then the RLM Bank 140 entry for the Destination Register is made to point to a newly created LB 150 entry that is composed of pointers corresponding to MIB data records of the LB 150 entries pointed to by RLM Bank 140 entries of all the Source Registers (e.g., see the process block 1107 of FIG. 11). The REF_CNT field of the LB 150 entries that were previously pointed to by a Destination Register's RLM Bank 140 entry are decremented. Following this, if the REF_CNT field of any of the LB 150 entries has a value of "0," then that LB 150 entry is released and/or deleted (cleared). However, for the LB 150 entries whose REF_CNT field does not have a value of "0," those LB 150 entries are not released and/or deleted (cleared).

If the Destination Register is updated by data read from the system memory 170 using a LOAD instruction, then the Destination Register's LB 150 entry is extended by addition of a new LB 150 entry pointing to the MIB data record corresponding to the LOAD instruction. Alternatively, in case the REF_CNT field of the Destination Register's original LB 150 entry has a value of "1" (i.e., no other RLM Bank 140 entry is referring to it), then that LB 150 entry may be extended with an additional pointer to the MIB data record entry without modifying the RLM Bank 140 entry of the Destination Register.

If the Destination Register is updated by a software unit computation involving other Source Registers, then its existing LB 150 entry may be extended by an addition of pointers to MIB data records pointed to by LB 150 entries corresponding to RLM Bank 140 entries of all the Source Registers.

Note that the REF_CNT field of the LB 150 entry corresponding to the register in the Data Bank 141 that provides data for a SW IP Task STORE instruction is incremented. This may be performed to ensure that the LB 150 entry is never deleted, since it is cross-referenced during the IAC.

As previously described, the LBP field of the MIB data record corresponding to the SW IP Task STORE instruction points to the LB 150 entry based on the RLM Bank 140 entry (or entries) of the register(s) in the Data Bank 141 that provides the data that is written to the system memory 170 by the STORE instruction. In this process, the MRL field of the MIB data record is updated to point to the list of MIB data record(s) obtained by traversing the MIB data record list pointed to by the LB 150 entry noted in the LBP field. Further, the BSE field of each of the above MIB data records may be extended to add an element that points to the MIB data record corresponding to the SW IP Task STORE instruction.

The foregoing is further described with respect to the process blocks 1210-1213 in FIG. 12. For an MIB data record having a software IP Type (IP Type=SW), the system and method 1200 proceeds from the process block 1203 to the process block 1210 to traverse the listing of MIB data records pointed to by the LBP field of the MIB data record found in the process block 1201 (e.g., see the MIB data record MIB-16 in FIG. 6). If it is determined in the process block 1211 that the end of the listing of MIB data records has not ended, then the system and method 1200 proceeds to the process block 1212 to add an identification of the next MIB data record in the listing to the MRL field of the MIB data record found in the process block 1201 (e.g., see the MIB data record MIB-16 in FIG. 7). Furthermore, the BSE field of this particular MIB data record may be populated to include a pointer to the MIB data record found in the process block 1201.

The following example illustrates use of RIM data records to populate the MRL field of SW IP Task STORE instructions as a mechanism to implement the IAC for SW IP Task Operations in accordance with embodiments of the present invention.

Referring to FIGS. 5-7, examples are shown of the system and method 1200 of FIG. 12 in which the MRL and MWL fields of MIB data records in the debug data memory 180 are updated as shown in FIG. 7. Note that in FIG. 7, not all of the MIB data record fields are shown as illustrated in FIG. 2 for the sake of simplicity. For the Operation IP1-K performed by the HW IP module 102*a*, the MRL field of the MIB-13 data record (the MIB data record with BLOCK_SEQ=END) is updated with pointers to a list of the MIB data records MIB-10 and MIB-11, which are the MIB data records corresponding to the system memory READ instructions initiated by this Operation. Similarly, the MWL field is updated with a pointer to the MIB data record MIB-12.

For the SW IP Task 160*a* (designated with an IP ID of T1), the MRL field of the MIB data record MIB-16 (the MIB data record with BLOCK_SEQ=END) is populated with pointers to the MIB data records pointed to by the LB 150 entry LB3, i.e., the MIB data records MIB-14 and MIB-15.

FIG. 10 illustrates another example of utilization of a RLM Bank 140 data record for achieving the IAC of exemplary software unit STORE instructions. FIG. 10 is depicted to include, for this example, fields that may be maintained in the debug data memory 180, the RLM Bank 140, and/or the LB 150. Note that in FIG. 10, not all of the MIB data record fields, including the LBP fields, are shown as illustrated in FIG. 2 for the sake of simplicity. The software unit instruction with an ID of 3 is a LOAD instruction that reads data from the system memory address A1 (with size S1) and LOADS it into the Data Bank 141 register R0. The RLM Bank 140 entry for the Data Bank 141 register R0 points to a newly created (by embodiments of the present invention) LB 150 entry, LB0, which now has a single entry pointing to the MIB data record having a MIB ID value of "1" (labeled as LB0:1) and has a REF_CNT value of "1" (labeled as [1]), since only the R0 entry of the RLM Bank 140 is referencing it. The software unit instruction with an ID of 10 is similar, except, in this case, notice that the REF_CNT value for the LB 150 entry LB0 is decremented (from [2] to [1]) since the RLM Bank 140 entry for the register R0 is no longer referencing LB0. The software unit instruction with an ID of 13 also works similarly. In this case, notice that since the REF_CNT field for LB3 had a value of "1" prior to this instruction execution (see the software unit instruction ID of 12), the LB 150 entry LB3 is deleted since it is not being referenced anymore.

The software unit instruction with an ID of 4 is a LOAD instruction that updates the Data Bank 141 register R0. The LB 150 entry LB0 is extended to include an element pointing to the MIB data record with an MIB ID value of "2" (LB0:1,2), while the RLM Bank 140 entry for the Data Bank 141 register R0 continues to point to LB0. The software unit instruction with an ID of 6 functions similarly, except in this case, since LB0 has a REF_CNT field value greater than 1, a new LB 150 entry LB1 is assigned to the RLM. Bank 140 entry corresponding to the Data Bank 141 register R3, and updated with a pointer to the relevant MIB data records.

The software unit instruction with an ID of 5 writes to the Data Bank 141 register R3 using contents of the Data Bank 141 register R0. The RLM Bank entry for the Data Bank 141 register R3 is updated with a pointer to LB0, and the REF_CNT field of LB0 is incremented (LB0:1,2[2]).

The software unit instruction with an ID of 7 is a memory STORE instruction, having an MIB ID of 4, where the system memory 170 is written using the contents of the Data Bank 141 register R0. The MRL field of this MIB data record is therefore updated using the RLM Bank 140 entry corresponding to the Data Bank 141 register R0, i.e., the MIB data records referenced by LB0, i.e., the MIB data records with indices of 1 and 2. Also note that the BSE fields of the MIB data records 1 and 2 are made to point to the MIB data record 4. In addition, the REF_CNT field of the LB 150 entry corresponding to the Data Bank 141 register R0 (i.e., LB0) is incremented to indicate that the LBP entry of the MIB data record 4 is referencing it. The software unit instructions with an ID of 11, 14 work similarly. Note that the software unit instruction with an ID of 11 extends the BSE fields of the MIB data records 1, 2 with the additional entry for the MIB data record 6.

The software unit instruction with an ID of 12 updates the Data Bank 141 register R3 using the contents of the Data Bank 141 register R0. Since the previous LB1 has a REF_CNT field value greater than 1, the RLM Bank 140 entry for the register R3 is updated with a pointer to a newly created LB 150 entry that points to the MIB data records corresponding to the LB 150 entries LB1 and LB2. Further, the REF_CNT field of LB1 of the LB 150 entry is decremented.

Inter-Operation Dependency Chaining ("IOC")

IOC corresponds to the process block 307 of FIG. 3, which is further described herein with respect to FIG. 13. A purpose of IOC is to chain, or interlock (create linked relationships), data dependencies across hardware unit (e.g., HW IP module) and software unit (e.g., SW IP Task) Operations, IOC creates linked relationships of the MIB data records having an Access Type=RD to the MIB data records having an Access Type=WR that are Producers of their read data in part or in full. In other words, a Producer in this context is represented by a MIB data record having an Access Type=WR that has written data (in part or in full) to the system memory 170 that is then read from the system memory 170 by an instruction represented by a MIB data record having an Access Type=RD. IOC also creates linked relationships of the MIB data records having an Access Type=WR to the MIB data records having an Access Type=RD that represent Consumers of their written data in part or in full. In other words, a Consumer in this context is represented by a MIB data record having an Access Type=RD that has read data (in part or in full) from the system memory 170 that was previously written to the system memory 170 by a MIB data record having an Access Type=WR.

To effectuate the foregoing within the MIB data records, IOC populates the PLL field of the MIB data records having an Access Type=RD, and populates the CLL field of the MIB data records having an Access Type=WR. Also note that the Producer and Consumer relationship may occur in pairs, but embodiments of the present invention provide a pointer of each to the other so as to make resultant data dependency tracing efficient and flexible. A procedure for implementing IOC is described below with respect to FIG. 13.

For each MIB data record having an Access Type=WR, the system and method 1300 will insert a pointer into its CLL field to the Consumer(s) of the data written by the instruction corresponding to this MIB data record, i.e., to the MB data records with an Access Type=RD and whose {Addr,Size} overlaps with this MIB data record's {Addr, Size}.

Referring to FIG. 13, a MIB data record representing a Producer whose Consumers of this data are to be linked is referred to as MIB_P. In embodiments of the present invention, care may be taken to not link with a Consumer where there is an interspersed Producer overwriting the data produced by MIB_P. If an MIB data record having an Access Type=WR (referred to herein as MIB_W) is found by the process block 1302 that has an {Addr,Size} that overlaps with MIB_P, then a NULL value may be added into the CLL field of MIB_P (e.g., the CIB of the CLL field with CL_PTR=NULL) to mask out the overlapping data region and ensure that any future Consumers of this data region are not marked as Consumers of MIB_P. Essentially, the NULL value is used to indicate that the data region marked in the CIB is not valid for creating a Consumer linked relationship for MIB_P since it has been overwritten by a more recent Producer MIB_W.

In the process block 1303, the MIB data record listing is traversed forward. If an MIB data record having an Access Type=RD (designated in FIG. 13 as MIB_C) is found (see the process block 1304) that has {Addr,Size} overlap with MIB_P (i.e., is consuming at least part of the data produced by MIB_P) and is not fully contained within any of the NULL CIBs of MIB_P, then the process block 1305 will insert a pointer to MIB_C in the CLL field of MIB_P. Additionally, the process block 1305 will insert a pointer to MIB_P in the PLL field of MIB_C.

In accordance with some embodiments of the present invention, there can be multiple Producers and/or Consumers based on the {Addr,Size} in the MIB data record. For example, suppose an Address (Addr) indicated in a MIB data record is 0x1000 with Size of 128 Bytes and with Access Type=WR. There then may be multiple MIB data records with Access Type=RD with the following {Addr,Size}: Address=0x1000, Size=16 Bytes; Address=0x1008, Size=8 Bytes; Address=0x1010, Size=4 Bytes, etc. For all these MIB data records with Access Type=RD, a Producer is represented by the MIB data record with Address=0x1000, Size=128 Bytes, Access type=WR. A similar example can occur for Producers: there can be one MIB data record pertaining to an instruction reading a large amount of data that was produced by different instructions pertaining to MIB data records with smaller sizes each.

Also, there can be cases when there is an overlap: for example, for Access Type=WR, a first MIB data record may have Address=0x1000, Size=64 bytes, and a second MIB data record may have Address=0x1008, Size=8 bytes. Then, for the address range 0x1000-0x1007 and 0x1010-0x103f, a first MIB data record is the source, while for the address range 0x1008-100f, a second MIB data record is the source.

In order to handle such exemplary cases, embodiments of the present invention may perform the following: MIB_P.CLL.CIB<i>.{Addr,Size} should be set to mark the actual data overlap. Note that "actual overlap" should account for NULL CIBs since those mark out memory regions overwritten by a following Producer. In cases where overlap with NULL CIBs is found, leading to fragmentation of the overlapped memory region CIB<i>.{Addr,Size} may be represented as a non-contiguous list of {Addr<j>, Size<j>} pairs. In accordance with some embodiments of the present invention, CIB data records can be appropriately implemented to allow a vector of {Addr,Size}-tuples in order to handle such cases:

Point MIB_C.PLL.PIB<k>,PL_PTR field to MIB_P.

MIB_C.PLL.PIB<k>.{Addr,Size} should be set to mark the actual data overlap, as in case of MIB_P.CLL.CIB<i>, where <i>, <k> represent the indices of the CIB and PIB elements of MIB_P and MIB_C, respectively.

The process blocks 1301-1307 may be repeated until either MIB_P {Addr,Size} is fully covered (the YES path from the process block 1306), or an end of the MIB data record listing is reached (the YES path from the process block 1307).

In embodiments of the present invention, care may be taken to not link with an older Producer when there is a more recent Producer overwriting the complete or subset of data produced by the older Producer.

If an MIB data record, referred to as MIB_P, having an Access Type=WR is found that has {Addr,Size} overlap with MIB_C and is not fully contained within an existing MIB_C's PIB list, then embodiments of the present invention may point the MIB_C.PLL.PIB<i>.PL_PTR field to MIB_P. MIB_C.PLL.PIB<i>.PL, {Addr,Size} should be set to mark the actual data overlap that MIB_C has with MIB_P. Note that "actual overlap" should account for overlaps with existing MIB_C's PIBs. In case overlaps lead to fragmentation of the overlapped memory region that MIB_P has with MIB_C, PIB<i>.{Addr,Size} may be represented as a non-contiguous list of {Addr<j>, Size<j>} pairs. In accordance with some embodiments of the present invention, PIB data records can be appropriately implemented to allow a vector of {Addr,Size}-tuples to handle such cases:

Point MIB_P.CLL/CIB<k>.CL_PTR field to MIB_C.

MIB_P.CLL.CIB<k>.{Addr,Size} should be set to mark the actual data overlap, as in the case of MIB_C.PLL.PIB<i>, <i>, <k> represent the indices of the PIB and CIB elements of MIB_C and MIB_P, respectively.

Referring to FIGS. 5 and 8, examples are shown of the system and method 1300 of FIG. 13, in which the CLL and PLL fields of MIB data records are updated as shown in FIG. 8. Note that in FIG. 8, not all of the MIB data record fields are shown as illustrated in FIG. 2 for the sake of simplicity. Since the system memory READ ("RD") instruction ⑤ by the SW IP Task 160a (designated with an IP ID of T1) is from the system memory 170 address A3, which is the address written to by the WRITE ("WR") instruction performed by the HW IP module 102a (designated by an IP ID of IP1 and an INST ID of IP1-K), the PLL field of the MIB data record MIB-14 is updated with a pointer to the MIB data record MIB-12, and the CLL field of the MIB data record MIB-12 is updated with a pointer to the MIB data record MIB-14. Similarly, the PLL field of the MIB data record MIB-15 is updated with a pointer to the MIB data record MIB-13, and the CLL field of the MIB data record MIB-13 is updated with a pointer to the MIB data record MIB-15.

Figure 9:
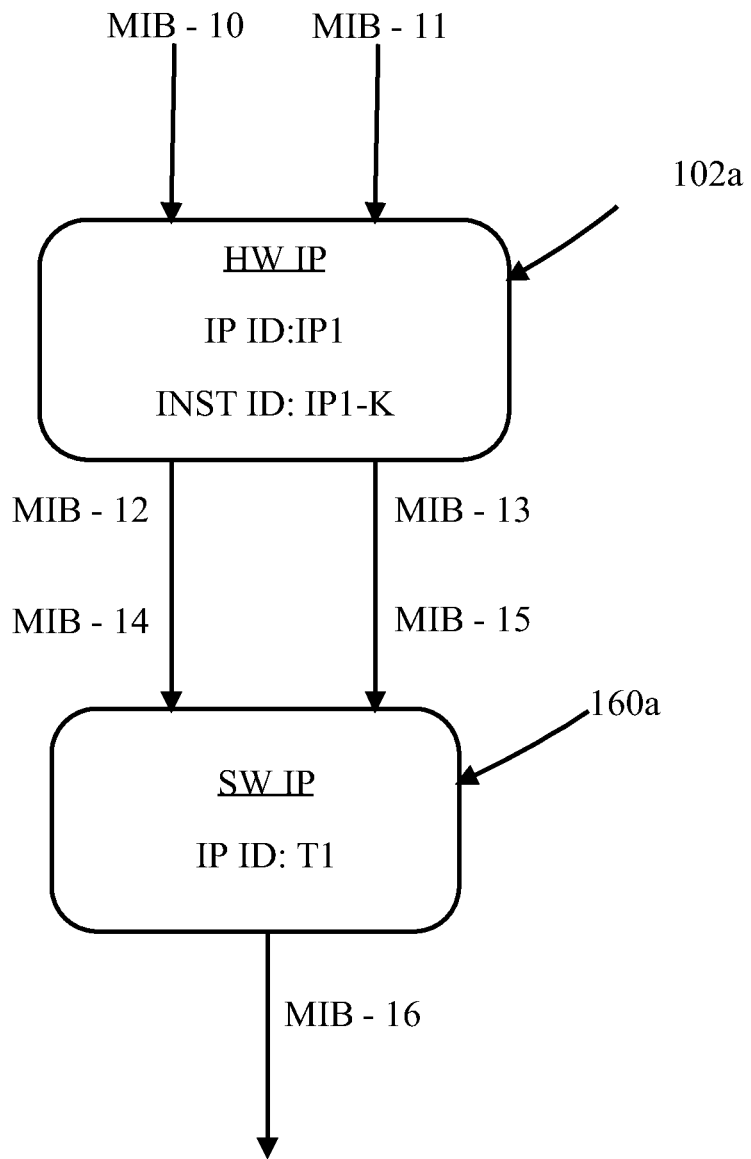
FIG. 9 illustrates an exemplary data dependency graph resulting from the Operations described with respect to FIG. 5.

Based on updates to the debug data memory 180 as previously described, the exemplary Operation data dependency graph as shown in FIG. 9 emerges. The output of the SW IP Task 106*a* (designated with an IP ID of T1), represented by the MIB data record MIB-16, is a function of its inputs noted in its MRL field, i.e., the MIB data records MIB-14 and MIB-15. The MIB data records MIB-14 and MIB-15 are in turn based on the MIB data records MIB-12 and MIB-13, respectively, as noted in their respective PLL fields. The MIB data records MIB-12 and MIB-13 are further based upon the MIB data records MIB-10 and MIB-11 as noted in the MRL field of the MIB data record MIB-13.

This data dependency relationship can be expressed as the following exemplary Producer Tracing: the MIB data record MIB-16 is produced by the MIB data records MIB-14 and MIB-15, which in turn are produced by the MIB data records MIB-12 and MIB-13, respectively, which are in turn produced by the MIB data records MIB-10 and MIB-11. Thus, in this example, an observed error occurring at the output of the SW IP Task 160*a* may be traced back to a root cause on this exemplary Operation data dependency path.

Figure 14:
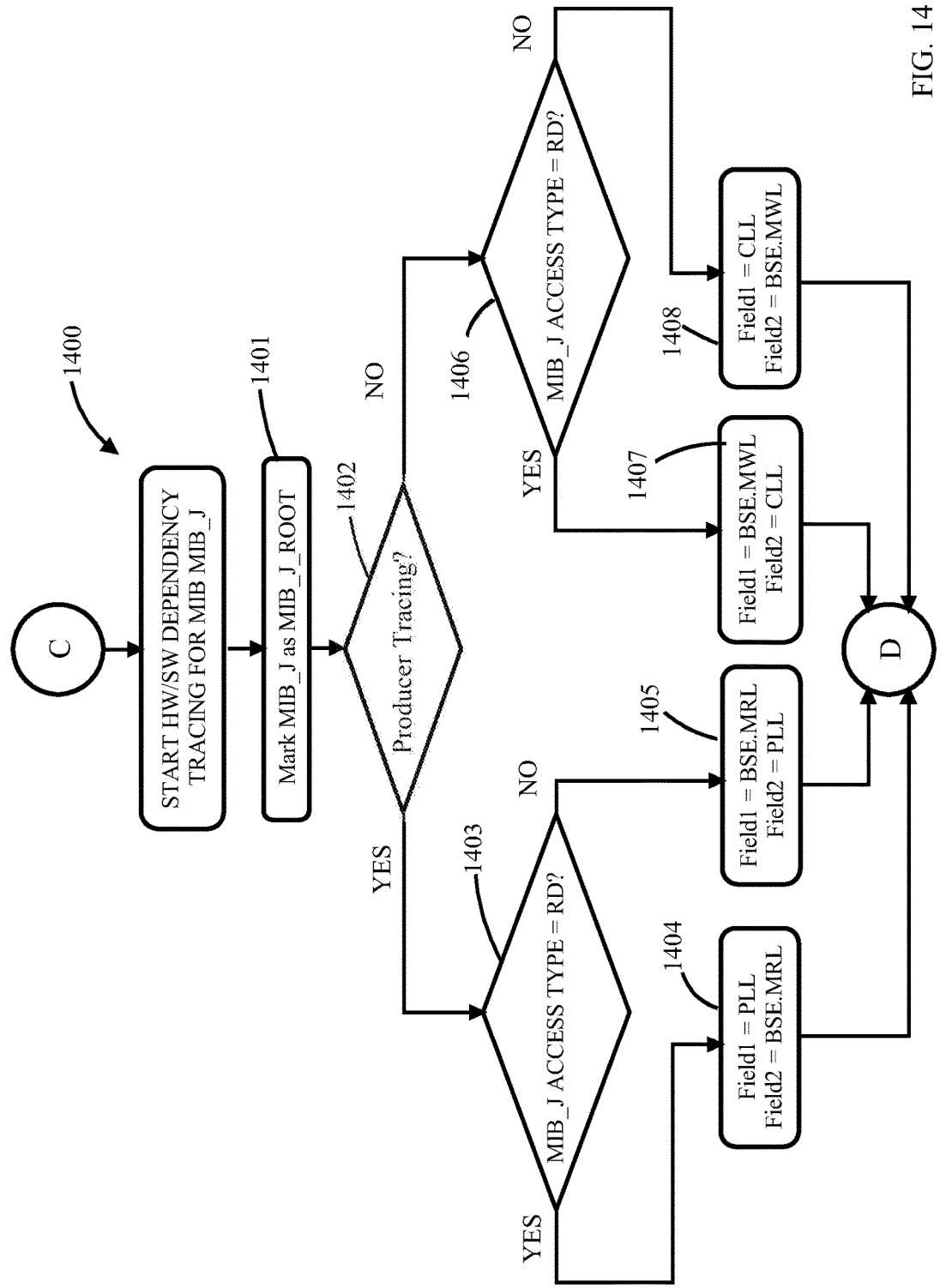
FIGS. 14-15 illustrate flowchart diagrams pertaining to hardware and software data dependency tracing.
Figure 15:
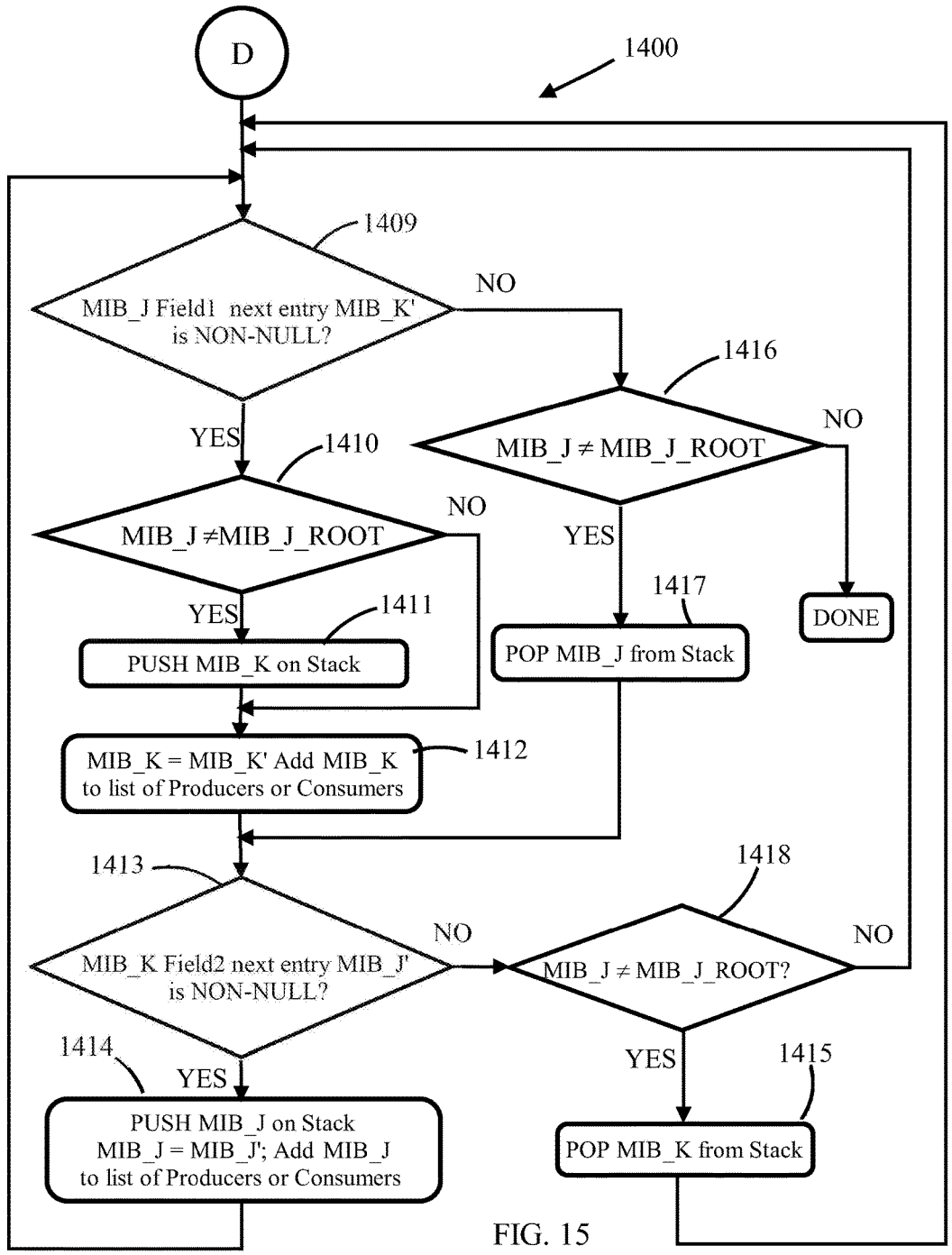

The following describes data dependency tracing as Consumer Tracing and/or Producer Tracing, which is performed in the process block 309 of FIG. 3, which is further described with respect to FIGS. 14-15. A useful outcome of performing the system and method 1400 described with respect to FIGS. 14-15 is a generation and output of a Producer and/or Consumer List, which may be recorded in the debug data memory 180 or any other memory location located internally or externally to the data processing system 100, which then may be output to a user (e.g., displayed or printed). A user of embodiments of the present invention can utilize such a Producer and/or Consumer List to diagnose a root cause of a failure occurring in the data processing system 100.

In accordance with embodiments of the present invention, Producer Tracing is a system and method, configured in accordance with embodiments of the present invention, for identifying the Producers of a specific system memory access as referenced by a specific MIB data record. Producer Tracing results in the previously noted Producer List. Taking the example previously described with respect to FIGS. 5-9, the data written to the system memory 170 address A5 (referenced by the MIB data record MIB-16 was produced as an output of a WRITE instruction performed by the SW IP Task 160*a* (designated with an IP ID of T1) using data read to the system memory 170 as recorded in the MIB data records MIB-14 and MIB-15. The MIB data record MIB-14 in turn was produced based on the WRITE instruction to the system memory 170 address A3, as recorded in the MIB data record MIB-12, which in turn was produced by the HW IP module 102*a* (designated with an IP ID of IP1 and an INST ID of IP1-K) using system memory 170 data read from the addresses A1 and A2, as recorded in the MIB data records MIB-10 and MIB-11. Similarly, the MIB data record MIB-15 can be traced to have been produced by the MIB data record MIB-13, which in turn was produced by the MIB data records MIB-10 and MIB-11. In this manner, it can be deduced that the written data represented by the MIB data record MIB-16 was produced based on system memory 170 accesses represented by the MIB data records MIB-14, MIB-15, MIB-12, MIB-13, MIB-10, and MIB-11. Similarly, the data represented by the MIB data record MIB-14 can be traced to have been produced based on the system memory 170 accesses represented by the MIB data records MIB-10, MIB-11, and MIB-12.

In accordance with embodiments of the present invention, Consumer Tracing is a system and method, configured in accordance with embodiments of the present invention, for identifying the Consumers of a specific system memory data access as referenced by a specific MIB data record. Consumer Tracing results in the previously noted Consumer List. Taking the example previously described with respect to FIGS. 5-9, the data read from the system memory 170 address A1 (referenced by the MIB data record MIB-10) was consumed by the HW IP module 102*a* (designated with an IP ID of IP1 and an INST ID of IP1-K) to compute output results (written data) as referenced by the MIB data records MIB-12 and MIB-13. The MIB data record MIB-12 in turn was consumed by the MIB data record MIB-14, which in turn was consumed by an instruction performed by the SW IP Task 160*a* (designated with an IP ID of T1) to produce output results (written data) as referenced by the MIB data record MIB-16. In a similar manner, the written data referenced by the MIB data record MIB-13 was consumed by instruction recorded in the MIB data record MIB-15, which in turn was consumed by an instruction performed by the SW IP Task 160*a* (designated with an IP ID of T1) to compute output results (written data) as referenced by the MIB data record MIB-16. In this manner, a data dependency trace can be deduced that the system memory 170 data represented by the MIB data record MIB-10 was consumed by the MIB data records MIB-12, MIB-13, MIB-14, MIB-15, and MIB-16. Similar tracing for the system memory 170 data referenced by the MIB data record MIB-13 will provide the MIB data records MIB-15 and MIB-16 as Consumers.

Referring to FIGS. 14-15, there is illustrated a system and method 1400, configured in accordance with embodiments of the present invention, for performing data dependency tracing, starting with a system memory access represented by a specific MIB data record referred to herein as MIB_J. This is accomplished by traversing the data interdependencies previously interlocked via IAC and IOC (see FIGS. 12 and 13). Conceptually, FIGS. 14-15 represent an iterative tree traversal flow, where in each iteration, {MIB-J, MIB-K} represent a pair of MIB data records—one of Access Type=WR and another of Access Type=RD that were interlocked via a previously performed IAC and/or IOC. Within FIGS. 14-15, MIB-J and MIB-K can represent either an MIB data record of Access Type=WR or of Access Type=RD; if MIB-J represents an MIB data record of Access Type=WR, then MIB-K represents an MIB data record of Access Type=RD, and vice versa. In each iteration of FIG. 15, the MIB data records pair {MIB-J, MIB-K} is updated to traverse deeper into the dependency tree referenced by new MIB data records MIB-J' and MIB-K', which are then referred to as {MIB-J, MIB-K} after saving the previous MIB data records pair in a storage location, which may be implemented as a stack memory area. A stack memory area (also referred to herein as simply a "Stack") is being used herein to designate a storage scratch memory similarly to how a software stack is utilized. In some embodiments of the present invention, once the system and method 1400 in FIGS. 14-15 is completed, a state of the Stack is the same as what it was at the beginning of the system and method 1400, i.e., every item pushed onto the Stack has been popped out as well. As such, a Stack is a scratch memory area used to record temporary data structures. The system and method 1400 may iterate until the entire dependency tree is traversed. The MIB data record pairs are saved in the Stack so that, once the leaf nodes are reached on one dependency path, the search is continued at other branches of the dependency tree.

The system and method 1400 illustrated in FIGS. 14-15 may be explained in context of an example of Producer Tracing of the MIB data record MIB-16 previously disclosed with respect to FIGS. 5-9, while also referring to the table illustrated in FIG. 20. For example, a user of embodiments of the present invention may desire to perform data dependency tracing for the exemplary MIB data record MIB-16.

The tables shown in FIGS. 20-22 conceptually illustrate exemplary values created by the system and method 1400, including the contents of the previously noted Stack through iterations of a dependency tree created by performance of the system and method 1400. Note that in the tables illustrated in FIGS. 20-22, for the sake of simplicity, an empty table cell implies that there is no change M value of the entity (e.g., MIB_J, MIB_J', etc.) by that process block from the previous process block. A dash "-" designated in a table cell implies that it is empty.

In the process block 1401, since the desire is to conduct data dependency tracing for the MIB data record MIB-16, the value MIB_J_ROOT is set to the MIB data record MIB-16, and the value MIB_J is set to the MIB data record MIB-16.

In the process block 1402, since the desire by the user in this example is to conduct Producer Tracing relative to the MIB data record MIB-16, the system and method 1400 proceeds to the process block 1403. In the process block 1403, since the MIB data record MIB-16 has an Access Type=WR, the system and method 1400 proceeds to the process block 1405. In the process block 1405, the system and method 1400 sets the value of Field1=BSE.MRL and the value of Field2=PLL.

In the process block 1409, as shown in FIG. 8, the BSE, field for the MIB data record MIB-16 is pointing to MIB-16 itself. And, the MRL field for the MIB data record MIB-16 contains a list of pointers to the MIB data records MIB-14 and MIB-15. Therefore, the process block 1409 sets MIB_K' to the MIB data record MIB-14. Because MIB-K' is a non-Null value, the system and method 1400 proceeds to the process block 1410. (Note that in a following return iteration to the process block 1409, MIB_K' will be set to the MIB data record MIB-15.)

In the process block 1410, at this stage of the iteration, MIB_J, as well as MIB_J_ROOT, are set to the MIB data record MIB-16. Therefore, since MIB-J is equal to MIB_J_ROOT, the system and method 1400 proceeds to the process block 1412. In the process block 1412, MIB_K is set to the value of MIB_K', which is the MIB data record MIB-14 as previously determined in the process block 1409. The MIB data record MIB-14 (MIB_K) is added to the Producer List.

Next, in the process block 1413, the PLL field (Field2) of the MIB data record MIB-14 (MIB_K) has a pointer to the MIB data record MIB-12 as noted in FIG. 8. The process block 1413 sets MIB_J' to the MIB data record MIB-12. Because MIB_J' is a non-Null value, the system and method 1400 proceeds to the process block 1414. Note that MIB_J' designates an MIB data record that is designated as MIB_J in the next iteration of the system and method 1400 of FIG. 15. Consequently, in the process block 1414, the present value of MIB_J, i.e., the MIB data record MIB-16, is saved on the Stack, and MIB_J is set to the MIB data record MIB-12 for the next iteration. Further, the MIB data record MIB-12 is added to the Producer List.

Hereafter, the next iteration of the system and method in FIG. 15 is started with the MIB data records pair {MIB-12, MIB-14}. Subsequent iterations are tabulated in the table shown in FIG. 20 beginning at Iteration 10. As noted in the description of the example of Producer Tracing of the MIB data record MIB-16 above, the iteration arrives at Iteration 54 with the Producer List populated with the MIB data records MIB-14, MIB-15, MIB-12, MIB-13, MIB-10, and MIB-11, as expected.

FIG. 21 shows the details of an exemplary execution of the system and method 1400 of FIGS. 14-15 for Producer Tracing of the MIB data record MIB-14. In the process block 1401, since the desire is to conduct data dependency tracing for the MIB data record MIB-14, the value MIB_J_ROOT is set to the MIB data record MIB-14, and the value MIB_J is set to the MIB data record MIB-14.

In the process block 1402, since the desire by the user in this example is to conduct Producer Tracing relative to the MIB data record MIB-14, the system and method 1400 proceeds to the process block 1403. In the process block 1403, since the MIB data record MIB-14 has an Access Type=RD, the system and method 1400 proceeds to the process block 1404. In the process block 1404, the system and method 1400 sets the value of Field1=PLL and the value of Field2=BSE.MRL.

In the process block 1409, as shown in FIG. 8, the PLL field for the MIB data record MIB-14 is pointing to the MIB data record MIB-12. Therefore, the process block 1409 sets MIB-K' to the MIB data record MIB-12. Because MIB-K' is a non-Null value, the system and method 1400 proceeds to the process block 1410.

In the process block 1410, at this stage of the iteration, MIB_J, as well as MIB_J_ROOT, are set to the MIB data record MIB-14. Therefore, since MIB-J is equal to MIB_J_ROOT, the system and method 1400 proceeds to the process block 1412. In the process block 1412, MIB_K is set to the value of MIB_K', which is the MIB data record MIB-12 as previously determined in the process block 1409. The MIB data record MIB-12 (MIB_K) is added to the Producer List.

Next, in the process block 1413, the BSE field (Field2) of the MIB data record MIB-14 (MIB_K) has a pointer to the MIB data record MIB-13. The MRL field for the MIB data record. MIB-13 includes a list of pointers to the MIB data records MIB-10 and MIB-11, as shown in FIG. 8. Therefore, the process block 1413 sets MIB_J' to the MIB data record MIB-10. Because MIB_J' is a non-Null value, the system and method 1400 proceeds to the process block 1414. Note that MIB_J' designates an MIB data record that is designated as MIB_J in the next iteration of the system and method 1400 of FIG. 15. Consequently, in the process block 1414, the present value of MIB_J, i.e., the MIB data record MIB-14, is saved on the Stack, and MIB_J is set to the MIB data record MIB-10 for the next iteration. Further, the MIB data record MIB-10 is added to the Producer List.

Hereafter, the next iteration of the system and method in FIG. 15 is started with the MIB data records pair {MIB-10, MIB-12}. Subsequent iterations are tabulated in the table shown in FIG. 21 beginning at Iteration 10. As noted in the description of the example of Producer Tracing of the MIB data record MIB-14 above, the iteration arrives at Iteration 21 with the Producer List populated with the MIB data records MIB-12, MIB-10, and MIB-11, as expected.

FIG. 22 shows the details of an exemplary execution of the system and method 1400 of FIGS. 14-15 for Consumer Tracing of the MIB data record MIB-10. In the process block 1401, since the desire is to conduct data dependency tracing for the MIB data record MIB-10, the value MIB_J_ROOT is set to the MIB data record MIB-10, and the value MIB_J is set to the MIB data record MIB-10.

In the process block 1402, since the desire by the user in this example is to conduct Consumer Tracing relative to the MIB data record MIB-10, the system and method 1400 proceeds to the process block 1406. In the process block 1406, since the MIB data record MIB-10 has an Access Type=RD, the system and method 1400 proceeds to the process block 1407. In the process block 1407, the system and method 1400 sets the value of Field1=BSE.MWL and the value of Field2=CLL.

In the process block 1409, as shown in FIG. 8, the BSE field for the MIB data record MIB-10 is pointing to the MIB data record MIB-13. The MWL field for the MIB data record MIB-13 contains a pointer to the MIB data record MIB-12. Therefore, the process block 1409 sets MIB_K' to the MIB data record MIB-12. Because MIB-K' is a non-Null value, the system and method 1400 proceeds to the process block 1410.

In the process block 1410, at this stage of the iteration, MIB_J, as well as MIB_J_ROOT, are set to the MIB data record MIB-10. Therefore, since MIB-J is equal to MIB_J_ROOT, the system and method 1400 proceeds to the process block 1412. In the process block 1412, MIB_K is set to the value of MIB_K', which is the MIB data record MIB-12 as previously determined in the process block 1409. The MIB data record MIB-12 (MIB_K) is added to the Consumer List.

Next, in the process block 1413, the CLL field (Field2) of the MIB data record MIB-12 (MIB_K) has a pointer to the MIB data record MIB-14 as noted in FIG. 8. The process block 1413 sets MIB_J' to the MIB data record MIB-14. Because MIB_J' is a non-Null value, the system and method 1400 proceeds to the process block 1414. Note that MIB_J' designates an MIB data record that is designated as MIB_J in the next iteration of the system and method 1400 of FIG. 15. Consequently, in the process block 1414, the present value of MIB_J, i.e., the MIB data record MIB-10, is saved on the Stack, and MIB_J is set to the MIB data record MIB-14 for the next iteration. Further, the MIB data record MIB-14 is added to the Consumer List.

Hereafter, the next iteration of the system and method in FIG. 15 is started with the MIB data records pair {MIB-14, MIB-12}. Subsequent iterations are tabulated in the table shown in FIG. 22 beginning at Iteration 10. As noted in the description of the example of Consumer Tracing of the MIB data record MIB-10 above, the iteration arrives at Iteration 40 with the Consumer List populated with the MIB data records MIB-14, MIB-15, MIB-12, MIB-13, and MIB-16, as expected.

The specific MIB data record used to begin an iteration of the system and method 1400 may be based on a received user input. For example, a user selecting a READ instruction by a software unit (to determine its Producer) would lead to a backward search for the closest previous MIB data record whose {Addr,Size} matches the READ instruction by the software unit. Or, a user selecting a WRITE instruction by a software unit (to determine its Consumer) would lead to a forward search for the closest previous MIB data record whose {Addr,Size} matches the WRITE instruction by the software unit.

Alternatively, embodiments of the present invention may implement a graphical user interface, where MIB data records can be shown in chronological order, and a user can select specific hardware or software unit instructions to obtain desired Consumer/Producer data dependency traces. Also, note that the Consumer and Producer can be arbitrarily mixed when tracing. For example, the output of Operation-A is consumed by Operation-B; (another) input of Operation-B is produced by Operation-C, another input of Operation-C is consumed by Operation-D, etc.

The various MIB data records disclosed herein can be recorded in a host computer memory in case this debug scheme is implemented in a simulation/emulation. For silicon implementation, these can be recorded in an internal trace buffer, and then transferred into an off-chip storage once the internal trace buffer exceeds a predefined threshold, or by using some other scheme.

If the MIB data records are live data records in a host memory (as may be in the case of a simulation/emulation), the chaining and tracing functions can be readily implemented using pointer-type data records. If on the other hand, the MIB data records are to be post processed (as may be the case for silicon debug), a unique BLK_ID may be added to each MIB data record, and chaining and tracing functions may use a BLK_ID instead of pointer data records.

While embodiments of the present invention may be utilized to trace data dependencies between hardware/software unit Operations, embodiments of the present invention may also be applied to memory-mapped register access production/consumption tracing.

In some cases, data processing systems, such as the data processing system 100 may be implemented as a SOC having multiple memory maps. Embodiments of the present invention may be readily extended for such a case to include an addition of a memory space ID derived tag to the Addr field of a MIB data record.

Figure 16:
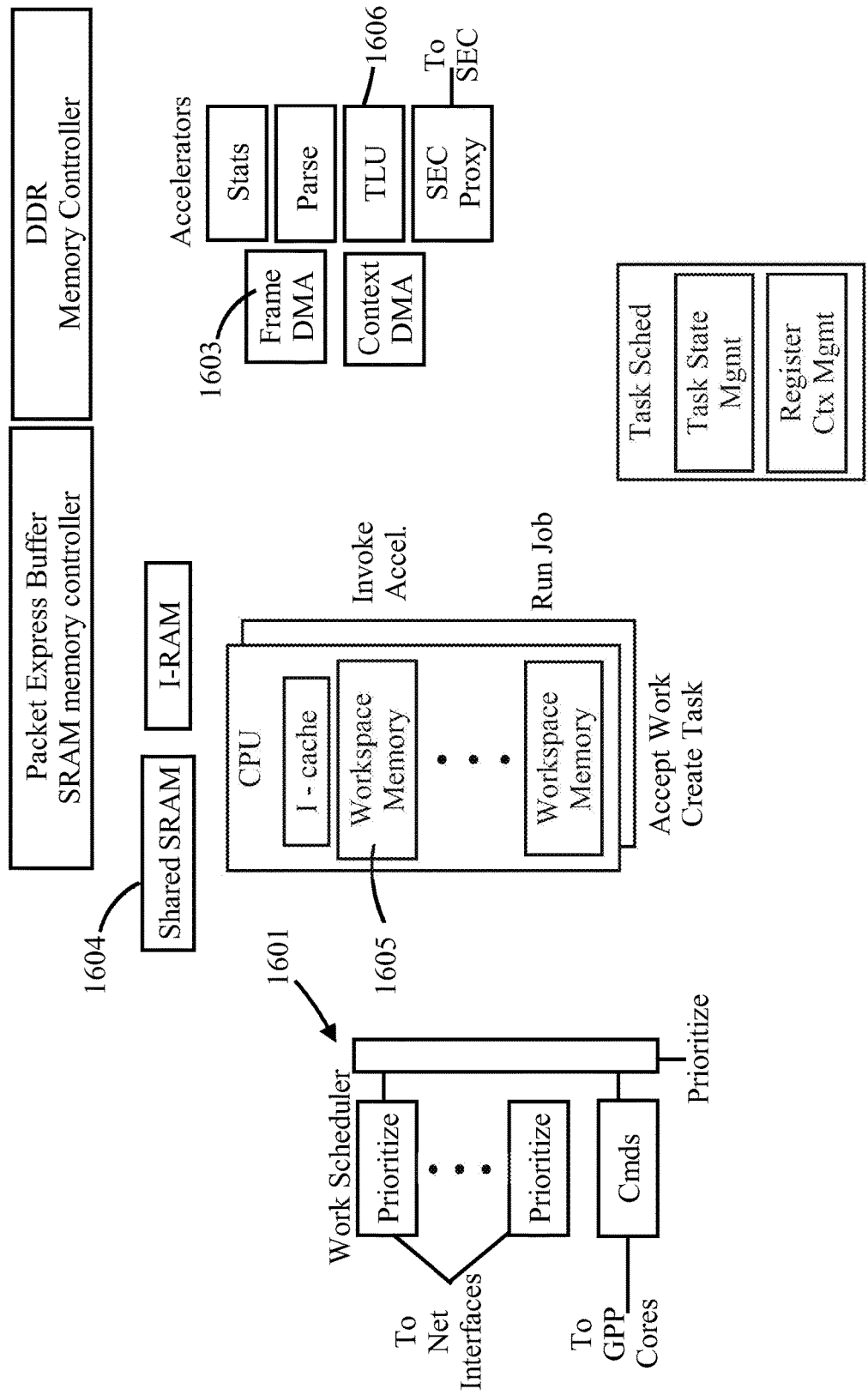
FIG. 16 illustrates portions of an advanced I/O processor performing memory accesses that are traced utilizing embodiments of the present invention.

Application of the debug techniques described herein with respect to embodiments of the present invention will now be illustrated with an exemplary debugging scenario in the context of a packet processing flow occurring within an exemplary Advanced I/O Processor ("AIOP") 1600 in accordance with the exemplary data flow depicted in FIG. 16. The data flow processes involved in this exemplary scenario are as follows:

Data. Flow Process 1: A Work Scheduler 1601 receives a data packet for processing from a Queue Manager 1602 (an accelerator engine external to the AIOP 1600), and triggers commencement of an Operation by a Frame-DMA ("FDMA") accelerator 1603 (a hardware unit (e.g., a HW IP module designated in this example with an IP ID of FDMA and an INST ID of 1)).

Data Flow Process 2: The FDMA accelerator 1603 performs three direct memory accesses ("DMAs") of three data entities from an external memory 1604 to an AIOP workspace memory 1605: packet data, packet annotation-1, and packet annotation-2. These DMAs are recorded as MIB data records in the MIB data records 1-3, as shown in FIGS. 17-19. The packet annotation-1 represents packet metadata exchanged between AIOP cores and AIOP accelerators. The packet annotation-2 represents packet metadata that is relevant to a software unit Operation to be performed. Following the FDMA accelerator 1603 completion, processing for this packet is initiated as a software unit Operation (e.g., a SW IP Task) on an AIOP core (designated in this example as CPU0).

Data Flow Process 3: The software unit Operation reads packet data and packet annotations from the workspace memory 1605 (see the MIB data records 7-9) and performs some programmed computations.

Data Flow Process 4: The software unit Operation then writes a Table Lookup Unit ("TLU") command to the AIOP workspace memory 1605 (see the MIB data record 10), which triggers execution of a command in a TLU accelerator 1606 (e.g., a HW IP module (hardware unit) designated in this example with an IP ID of TLU and an INST ID of 2). While the TLU accelerator 1606 is executing, the software unit Operation is suspended. In place of this software unit Operation, another software unit Operation may be initiated for execution on the AIOP core (e.g., a GPP).

Data Flow Process 5: The TLU accelerator 1606 reads the command and packet data from the workspace memory 1605, and writes the lookup result to the workspace memory 1605 (see the MIB data record 13). Following completion of the Operation by the TLU accelerator 1606, the suspended software unit Operation is resumed.

Data Flow Process 6: The software unit Operation reads the TLU output from the workspace memory 1605 (see the MIB data record 14), performs some programmed computations, then writes a FDMA command to the workspace memory 1605 (see the MIB data record 15), which triggers commencement of an Operation by the FDMA accelerator 1603 (a hardware unit). While the FDMA accelerator 1603 is executing, the software unit Operation is suspended.

Data Flow Process 7: The FDMA accelerator 1603 reads the command from the workspace memory 1605 (see the MIB data record 16), processes it, and writes the response to the workspace memory 1605 (see the MIB data record 17). Following completion of the Operation by the FDMA accelerator 1603, the suspended software unit Operation is resumed.

Data Flow Process 8: The software unit Operation reads the FDMA response from the workspace memory 1605 (see the MIB data record 18), and processes it. In the course of this processing, the response is identified as an error response, e.g., the FDMA accelerator 1603 could not successfully early out the DMA command. An error response may be generally identified using the return status written by the FDMA to the workspace memory (in such an example, a status of zero indicates a success, and a non-zero value indicates an error). Furthermore, different encodings may be used to indicate different types of errors that can occur during processing performed by the FDMA.

Data Flow Process 9: At this point, the software unit Operation may process the error response in an appropriate manner (e.g., which could be performed by creating a new error handling task or generating an interrupt).

In this exemplary scenario, the end result is an error processing software unit executing on the AIOP core in the Data Flow Process 9; and from the error signature, it can be determined that the error was triggered by the software unit Operation executed in the Data Flow Process 8. Further, error signature analysis points to a failure of the FDMA command due to an illegal address. What is not immediately clear, however, is what was the root cause of the FDMA illegal address. In this example, the root cause actually was an error in the FDMA execution in the Data Flow Process 2 (specifically, a portion of the packet data being overwritten by packet annotations, which led to an incorrect TLU accelerator lookup result, which eventually led to a DMA failure due to the illegal address).

Utilizing debugging techniques as described herein with respect to embodiments of the present invention, the data exchanged between the various hardware and software units of the foregoing example can be traced backwards in time through the Producers/Consumers of the data, eventually leading to the source of the error. Specifically, the status read by the software unit Operation of the Data Flow Process 8 can be traced back to a status WRITE instruction by the FDMA. Operation of the Data Flow Process 7, which can be further traced back to being triggered by execution of the FDMA WRITE command by the software unit Operation of the Data Flow Process 6. That can be further traced to be based on data written by the TLU Operation output of the Data Flow Process 5, which in turn can be traced to execution of the software unit Operation of the Data Flow Process 3 and the Data Flow Process 4. The software unit Operation of the Data Flow Process 3 can be further traced to the FDMA Operation executed in the Data Flow Process 2. Inspection of intermediate data in these data dependency tracing steps can be used by one skilled in the art of hardware and software implementations to rapidly focus in on the problem point, which in this example occurred in the Data Flow Process 2.

Provided below is a detailed exemplary application of embodiments of the present invention to debug the foregoing exemplary scenario:

System memory accesses initiated by each hardware and software unit Operation are recorded as MIB data records into a memory device (e.g., the debug data memory 180 of FIG. 1): The MIB data records (as identified in the MIB ID column) shown in FIG. 17 are recorded during the course of the executions of the hardware and software unit Operations described in this exemplary scenario. Note that at this stage, the CLL, PLL, MRL, MWL, and BSE fields are labeled with NULL values, and will be populated in accordance with embodiments of the present invention described herein.

FIG. 18 conceptually depicts updates made to the BSE, MRL, and MWL fields of these MIB data records using the IAC procedure previously described herein with respect to FIGS. 3 and 12. FIG. 19 conceptually depicts updates made to the CLL and PLL fields of the MIB data records using the IOC procedure previously described herein with respect to FIGS. 3 and 13. It should be noted that the PLL fields for the MIB data records 1-3 and the CLL fields for the MIB data record 19 are left with NULL values, since the dependencies for these MIB data records fall outside the scope of the recorded MIB data record trace of this example.

The tables in FIGS. 17-19 will now be utilized to illustrate how data dependency tracing described herein in accordance with embodiments of the present invention can be utilized as a technique to determine a root cause of the failure status reported in the MIB data record 18. Note that in FIGS. 17-19, not all of the MIB data record fields are shown as illustrated in FIG. 2 for the sake of simplicity.

Referring to FIG. 19, as indicated in the PLL field of the MIB data record 18, the input for the MIB 18 record was produced by the MIB data record 17. As indicated in the MRL field of the MIB data record 17, the output of the MIB data record 17, in turn, was produced based on consumption of the MIB data record 16. As indicated by the PLL field of the MIB data record 16, the input for the MIB data record 16 was produced by the MIB data record 15. As indicated by the MRL field of the MIB data record 15, the output of the MIB data record 15, in turn, was produced based on consumption of the MIB data record 14. As indicated by the PLL field of the MIB data record 14, the input for the MIB data record 14 was produced by the MIB data record 13. As indicated by the MRL field of the MIB data record 13, the output of the MIB data record 13, in turn, was produced based on consumption of the MIB data records 11 and 12. As indicated by the PLL field of the MIB data record 12, the input of the MIB 12 record was produced by the MIB data record 6. As indicated by the PLL field of the MIB data record 11, the input of the MIB data record 11 was produced by the MIB data record 10. As indicated by the MRL field of the MIB data record 10, the output of the MIB data record 10, in turn, was produced based on consumption of the MIB data records 7, 8, and 9. And, as indicated by the PLL fields of the MIB data records 7, 8, and 9, the inputs of the MIB data records 7, 8, and 9 were produced by the MIB data records 4, 5, and 6, respectively.

As a result, by utilizing the recorded MIB data records, debugging of the FDMA instructions producing the MIB data records 4, 5, and 6 as outputs (written data) reveals the error around the packet header data corruption by annotations.

This example demonstrates the use of embodiments of the present invention to trace backwards from the observable error of the MIB data record 18 through the various hardware and software unit Producers/Consumers of data, leading to the source of the error which is situated several instructions upstream from the instruction represented by the MIB data record 18. Note that the MIB data records depicted in this example pertain to a single packet processing chain through the data processing system 1600. In practice, produced MIB data records will likely be much more complex and interspersed with transactions pertaining to multiple packets in flight in such an exemplary system. Utilizing embodiments of the present invention, debugging of errors can be performed very well, while any attempt to debug via prior art manual tracing techniques would be cumbersome, error-prone, and practically untenable.

It should also be noted that embodiments of the present invention can be applied without loss of generality to data dependency tracing that may be constrained to a specific subset of hardware unit and software unit Operations from a specific CPU, specific software unit processes, a specific subset of software program addresses, data accesses pertaining to specific regions of a system memory, etc.

The various aspects of the present invention have been described in connection with a number of exemplary embodiments and scenarios. To facilitate an understanding of embodiments of the present invention, many aspects of the present invention have been described in terms of sequences of actions to be performed by elements of a data processing system or other hardware capable of executing program instructions and/or operating in accordance with stored configuration data. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more program processors). Thus, the various aspects of the present invention may be embodied in many different forms, and all such forms are contemplated to be within the scope of the invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "circuitry", "module," or "system." Furthermore, aspects of the present invention may take the form of a computer program product embodied in one or more computer readable storage medium(s) having computer readable program code embodied thereon, wherein the computer readable storage medium is not a transitory signal per se.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Computer program code for carrying out instructions for aspects of the present invention may be written in any combination of one or more programming languages, including, but not limited to, an object oriented programming language such as Java, Smalltalk, C++, or the like, and conventional procedural programming languages, such as the "C" programming language or similar programming languages. The computer program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Aspects of the present invention are described herein with reference to flowchart diagrams and/or block diagrams of methods, apparatus (systems) and computer program products according to embodiments of the invention. It will be understood that each block of the flowchart diagrams and/or block diagrams, and combinations of blocks in the flowchart diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture, including instructions that implement the functions/acts specified in the flowchart and/ or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present invention provide a method for operating debug circuitry to facilitate debugging of operations performed by a hardware unit and a software unit in a data processing system that includes a system memory, wherein the method includes, with respect to a first operation performed by the hardware unit, recording information pertaining to each instance of data read from the system memory and each instance of data written to the system memory in separate memory information blocks within a debug data memory; with respect to a second operation performed by the software unit, recording information pertaining to each instance of data read from the system memory and each instance of data written to the system memory in separate memory information blocks within the debug data memory; creating a first linked relationship in the debug data memory between the separate memory information blocks representing the data read from the system memory and the data written to the system memory by the first operation performed by the hardware unit; and creating a second linked relationship in the debug data memory between the separate memory information blocks representing the data read from the system memory and the data written to the system memory by the second operation performed by the software unit. The first operation performed by the hardware unit may include one or more computations of the data read from the system memory that culminates in the data written to the system memory by the first operation, wherein the second operation performed by the software unit includes one or more software program instructions performed on the data read from the system memory that results in the data written to the system memory by the second operation, wherein the second operation performed by the software unit is performed in a general purpose processor in the data processing system, wherein the hardware unit is implemented in the data processing system in circuitry separately from the general purpose processor. The method may further include creating a third linked relationship in the debug data memory between the separate memory information blocks representing the data read from the system memory by the second operation performed by the software unit and the data written to the system memory by the first operation performed by the hardware unit. The method may further include creating a third linked relationship in the debug data memory between the separate memory information blocks representing the data read from the system memory by the first operation performed by the hardware unit and the data written to the system memory by the second operation performed by the software unit. The method may further include creating a fourth linked relationship in the debug data memory between the separate memory information blocks representing the data read from the system memory by the second operation performed by the software unit and the data written to the system memory by the first operation performed by the hardware unit. The method may further include outputting a producer trace of one of the separate memory information blocks as a function of the first, second, third, and fourth linked relationships, wherein the producer trace includes a first list of the separate memory information blocks representing any of the data read from the system memory and any of the data written to the system memory that affected the data written to the system memory represented by the one of the separate memory information blocks. The method may further include outputting a consumer trace of one of the separate memory information blocks as a function of the first, second, third, and fourth linked relationships, wherein the consumer trace includes a first list of the separate memory information blocks representing any of the data read from the system memory and any of the data written to the system memory that affected the data written to the system memory represented by the one of the separate memory information blocks. Within the method, the first and second operations may be concurrently performed within the data processing system.

Aspects of the present invention provide a data processing system including a system memory; a hardware unit configured to perform first and second operations, wherein the first operation includes a first plurality of system memory accesses including a first read instruction of data read from the system memory and a first write instruction of data written to the system memory, wherein the second operation includes a second plurality of system memory accesses including a second read instruction of data read from the system memory and a second write instruction of data written to the system memory; a general purpose processor configured to perform a software unit operation that includes a third plurality of system memory accesses including a third read instruction of data read from the system memory and a third write instruction of data written to the system memory; a debug data memory, wherein the debug data memory is configured to record information pertaining to (1) each of the first, second, and third read instructions and (2) each of the first, second, and third write instructions in separate memory information blocks; and interconnect circuitry interconnecting the general purpose processor, the system memory, the hardware unit, and the debug data memory, wherein the hardware unit is configured to provide onto the interconnect circuitry with each of the first and second plurality of system memory accesses (1) separate identifications for each of the first and second operations, and (2) values identifying first and last system memory accesses performed by each of the first and second operations. The software unit may be configured to provide onto the interconnect circuitry with each of the third plurality of system memory accesses (1) a list of one or more memory locations that contained data used to compute data stored in a general purpose register of the general purpose processor, and (2) a value identifying a last system memory access performed by the software unit operation. The general purpose processor may further include a register load map bank and a load block both configured as arrays of entries, wherein each entry pertains to separate general purpose registers in the general purpose processor, wherein the register load map bank and the load block provide the list of one or more memory locations that contained data used to compute data stored in one of the general purpose registers of the general purpose processor. The debug data memory may be configured to: (1) create a first linked relationship between first and second separate memory information blocks, wherein the first separate memory information block represents data read from the system memory by the first operation, and wherein the second separate memory information block represents data written to the system memory by the first operation after the hardware unit has processed the data read from the system memory by the first operation; (2) create a second linked relationship between third and fourth separate memory information blocks, wherein the third separate memory information block represents data read from the system memory by the software unit operation, and wherein the fourth separate memory information block represents data written to the system memory by the software unit operation after the software unit operation has processed the data read from the system memory by the software unit operation; and (3) create a third linked relationship between fifth and sixth separate memory information blocks, wherein the fifth separate memory information block represents a first exchange of specific data between the system memory and the hardware unit, and wherein the sixth separate memory information block represents a second exchange of the specific data between the system memory and the software unit.

Aspects of the present invention provide a method for facilitating debugging of operations performed by a hardware unit and a software unit that are included in a data processing system that includes a system memory, wherein a first operation performed by the hardware unit includes a first plurality of instructions that read data from the system memory, perform a first computation, and write a result of the first computation to the system memory, wherein a second operation performed by the software unit includes a second plurality of instructions that read data from the system memory, perform a second computation, and write a result of the second computation to the system memory, wherein the method includes recording information pertaining to each of the first plurality of instructions performed by the hardware unit in separate memory information blocks within a debug data memory; recording information pertaining to each of the second plurality of instructions in separate memory information blocks within the debug data memory; creating a first linked relationship between first and second ones of the separate memory information blocks, wherein the first one of the separate memory information blocks represents a read instruction of data from the system memory by the hardware unit, and wherein the second one of the separate memory information blocks represents a write instruction of data to the system memory by the hardware unit after the hardware unit has processed the data read from the system memory; creating a second linked relationship between third and fourth ones of the separate memory information blocks, wherein the third one of the separate memory information blocks represents a read instruction of data from the system memory by the software unit, and wherein the fourth one of the separate memory information blocks represents a write instruction of data to the system memory by the software unit after the software unit has processed the data read from the system memory; and creating a third linked relationship between fifth and sixth ones of the separate memory information blocks, wherein the fifth one of the separate memory information blocks represents a first exchange of specific data between the system memory and the hardware unit, and wherein the sixth one of the separate memory information blocks represents a second exchange of the specific data between the system memory and the software unit. The recording of the information pertaining to the second plurality of instructions performed by the software unit in the debug data memory may further include determining whether a first one of the second plurality of instructions performed by the software unit accessed data residing in the system memory; if the first one of the second plurality of instructions performed by the software unit accessed data residing in the system memory, determining whether the first one of the second plurality of instructions included a load of data into a general purpose register; if the first one of the second plurality of instructions did not include the load of data into the general purpose register, then recording the information pertaining to the first one of the second plurality of instructions performed by the software unit into the fourth one of the separate memory information blocks; if the first one of the second plurality of instructions included the load of data into the general purpose register, then (1) updating a register load map bank entry associated with the general purpose register, wherein the register load map bank entry is updated to include a pointer to the third one of the separate memory information blocks, and (2) recording the information pertaining to the first one of the second plurality of instructions performed by the software unit into the third one of the separate memory information blocks; and if the first one of the second plurality of instructions performed by the software unit did not access data residing in the system memory, then updating a register load map bank entry associated with the general purpose register, wherein the register load map bank entry is updated to include a pointer to the third one of the separate memory information blocks. The creating the first linked relationship between the first and second ones of the separate memory information blocks may further include traversing forwards through the separate memory information blocks to find a memory information block representing a last instruction performed by the hardware operation, wherein the memory information block representing the last instruction performed by the hardware operation is the second one of the separate memory information blocks; traversing backwards through the separate memory information blocks from the second one of the separate memory information blocks to find the first one of the separate memory information blocks; inserting a first pointer to the first one of the separate memory information blocks into a memory read list field of the second one of the separate memory information blocks; and inserting a second pointer to the second one of the separate memory information blocks into a block sequential field of the first one of the separate memory information blocks. The creating the second linked relationship between the third and fourth ones of the separate memory information blocks may further include traversing forwards through the separate memory information blocks to find a memory information block representing a last instruction performed by the software operation, wherein the memory information block representing the last instruction performed by the software operation is the fourth one of the separate memory information blocks; traversing through the separate memory information blocks pointed to by a load block pointer field of the fourth one of the separate memory information blocks; inserting a third pointer into the memory read list field of the fourth one of the separate memory information blocks, wherein the third pointer points to the third one of the separate memory information blocks; and inserting a fourth pointer to the fourth one of the separate memory information blocks into a block sequential field of the first one of the separate memory information blocks. The creating the third linked relationships between the fifth and sixth ones of the separate memory information blocks may further include traversing forwards through the separate memory information blocks to find a memory information block representing a write instruction of data to the system memory by either the hardware or the software unit; traversing forwards through the separate memory information blocks from the memory information block representing the write instruction of data to the system memory by either the hardware or the software unit to find a memory information block representing a read instruction consuming at least part of the write instruction data; inserting a first pointer to the memory information block representing the read instruction consuming at least part of the write instruction data into a consumer linked list field of the memory information block representing the write instruction of data to the system memory by either the hardware or the software unit; and inserting a second pointer to the memory information block representing the write instruction of data to the system memory by either the hardware or the software unit into a producer linked list field of the memory information block representing the read instruction consuming at least part of the write instruction data. The creating the first linked relationship between the first and second ones of the separate memory information blocks may further include traversing forwards through the separate memory information blocks to find a memory information block representing a last instruction performed by the hardware operation, wherein the memory information block representing the last instruction performed by the hardware operation is the second one of the separate memory information blocks; traversing backwards through the separate memory information blocks from the second one of the separate memory information blocks to find the first one of the separate memory information blocks; inserting a first pointer to the first one of the separate memory information blocks into a memory read list field of the second one of the separate memory information blocks; and inserting a second pointer to the second one of the separate memory information blocks into a block sequential field of the first one of the separate memory information blocks; wherein the creating the second linked relationship between the third and fourth ones of the separate memory information blocks may further include traversing forwards through the separate memory information blocks to find a memory information block representing a last instruction performed by the software operation, wherein the memory information block representing the last instruction performed by the software operation is the fourth one of the separate memory information blocks; traversing through the separate memory information blocks pointed to by a load block pointer field of the fourth one of the separate memory information blocks; inserting a third pointer into the memory read list field of the fourth one of the separate memory information blocks, wherein the third pointer points to the third one of the separate memory information blocks; and inserting a fourth pointer to the fourth one of the separate memory information blocks into a block sequential field of the first one of the separate memory information blocks; wherein the creating the third linked relationships between the fifth and sixth ones of the separate memory information blocks may further include traversing forwards through the separate memory information blocks to find a memory information block representing a write instruction of data to the system memory by either the hardware or the software unit; traversing forwards through the separate memory information blocks from the memory information block representing the write instruction of data to the system memory by either the hardware or the software unit to find a memory information block representing a read instruction consuming at least part of the write instruction data; inserting a first pointer to the memory information block representing the read instruction consuming at least part of the write instruction data into a consumer linked list field of the memory information block representing the write instruction of data to the system memory by either the hardware or the software unit; and inserting a second pointer to the memory information block representing the write instruction of data to the system memory by either the hardware or the software unit into a producer linked list field of the memory information block representing the read instruction consuming at least part of the write instruction data. The method may further include generating a producer list for a specific instruction, wherein the producer list includes an identification of each system memory access that had an effect on data pertaining to the specific instruction, wherein the generating of the producer list further includes utilizing the block sequential, memory read list, and producer linked list fields to identify each system memory access that had the effect on the data pertaining to the specific instruction. The method may further include generating a consumer list for a specific instruction, wherein the consumer list includes an identification of each system memory access that had an effect on data pertaining to the specific instruction, wherein the generating of the consumer list further includes utilizing the block sequential, memory write list, and consumer linked list fields to identify each system memory access that had the effect on the data pertaining to the specific instruction.

In this document, the singular forms "a," "an," and "the" include plural referents unless the context clearly dictates otherwise. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. The use of the term "or" herein is used to mean "and/or" unless explicitly indicated to refer to alternatives only or the alternatives are mutually exclusive, although the disclosure supports a definition that refers to only alternatives and "and/or." Throughout this application, the terms "about" or "approximately" are used to indicate that a value includes the inherent variation of error for the device, the method being employed to determine the value, or the variation that exists among the study subjects.

The invention claimed is:

1. A method for operating debug circuitry to facilitate debugging of operations performed by a hardware unit and a software unit in a data processing system that includes a system memory, the method comprising:
   with respect to a first operation performed by the hardware unit, recording information pertaining to each instance of data read from the system memory and each instance of data written to the system memory in separate memory information blocks within a debug data memory;
   with respect to a second operation performed by the software unit, recording information pertaining to each instance of data read from the system memory and each instance of data written to the system memory in separate memory information blocks within the debug data memory;
   creating a first linked relationship in the debug data memory between the separate memory information blocks representing the data read from the system memory and the data written to the system memory by the first operation performed by the hardware unit; and
   creating a second linked relationship in the debug data memory between the separate memory information blocks representing the data read from the system memory and the data written to the system memory by the second operation performed by the software unit, wherein the first operation performed by the hardware unit comprises one or more computations of the data read from the system memory that culminates in the data written to the system memory by the first operation, wherein the second operation performed by the software unit comprises one or more software program instructions performed on the data read from the system memory that results in the data written to the system memory by the second operation, wherein the second operation performed by the software unit is performed in a general purpose processor in the data processing system, wherein the hardware unit is implemented in the data processing system in circuitry separately from the general purpose processor.

2. The method as recited in claim 1, further comprising creating a third linked relationship in the debug data memory between the separate memory information blocks representing the data read from the system memory by the second operation performed by the software unit and the data written to the system memory by the first operation performed by the hardware unit.

3. The method as recited in claim 1, further comprising creating a third linked relationship in the debug data memory between the separate memory information blocks representing the data read from the system memory by the first operation performed by the hardware unit and the data written to the system memory by the second operation performed by the software unit.

4. The method as recited in claim 3, further comprising creating a fourth linked relationship in the debug data memory between the separate memory information blocks representing the data read from the system memory by the second operation performed by the software unit and the data written to the system memory by the first operation performed by the hardware unit.

5. The method as recited in claim 4, further comprising outputting a producer trace of one of the separate memory information blocks as a function of the first, second, third, and fourth linked relationships, wherein the producer trace includes a first list of the separate memory information blocks representing any of the data read from the system memory and any of the data written to the system memory that affected the data written to the system memory represented by the one of the separate memory information blocks.

6. The method as recited in claim 4, further comprising outputting a consumer trace of one of the separate memory information blocks as a function of the first, second, third, and fourth linked relationships, wherein the consumer trace includes a first list of the separate memory information blocks representing any of the data read from the system memory and any of the data written to the system memory that affected the data written to the system memory represented by the one of the separate memory information blocks.

7. The method as recited in claim 1, wherein the first and second operations are concurrently performed within the data processing system.

8. A data processing system comprising:
a system memory;
a hardware unit configured to perform first and second operations, wherein the first operation comprises a first plurality of system memory accesses comprising a first read instruction of data read from the system memory and a first write instruction of data written to the system memory, wherein the second operation comprises a second plurality of system memory accesses comprising a second read instruction of data read from the system memory and a second write instruction of data written to the system memory;
a general purpose processor configured to perform a software unit operation that comprises a third plurality of system memory accesses comprising a third read instruction of data read from the system memory and a third write instruction of data written to the system memory;
a debug data memory, wherein the debug data memory is configured to record information pertaining to (1) each of the first, second, and third read instructions and (2) each of the first, second, and third write instructions in separate memory information blocks; and
interconnect circuitry interconnecting the general purpose processor, the system memory, the hardware unit, and the debug data memory, wherein the hardware unit is configured to provide onto the interconnect circuitry with each of the first and second plurality of system memory accesses (1) separate identifications for each of the first and second operations, and (2) values identifying first and last system memory accesses performed by each of the first and second operations.

9. The data processing system as recited in claim 8, wherein the software unit is configured to provide onto the interconnect circuitry with each of the third plurality of system memory accesses (1) a list of one or more memory locations that contained data used to compute data stored in a general purpose register of the general purpose processor, and (2) a value identifying a last system memory access performed by the software unit operation.

10. The data processing system as recited in claim 9, wherein the general purpose processor further comprises a register load map bank and a load block both configured as arrays of entries, wherein each entry pertains to separate general purpose registers in the general purpose processor, wherein the register load map bank and the load block provide the list of one or more memory locations that contained data used to compute data stored in one of the general purpose registers of the general purpose processor.

11. The data processing system as recited in claim 8, wherein the debug data memory is configured to:
(1) create a first linked relationship between first and second separate memory information blocks, wherein the first separate memory information block represents data read from the system memory by the first operation, and wherein the second separate memory information block represents data written to the system memory by the first operation after the hardware unit has processed the data read from the system memory by the first operation;
(2) create a second linked relationship between third and fourth separate memory information blocks, wherein the third separate memory information block represents data read from the system memory by the software unit operation, and wherein the fourth separate memory information block represents data written to the system memory by the software unit operation after the software unit operation has processed the data read from the system memory by the software unit operation; and
(3) create a third linked relationship between fifth and sixth separate memory information blocks, wherein the fifth separate memory information block represents a first exchange of specific data between the system memory and the hardware unit, and wherein the sixth separate memory information block represents a second exchange of the specific data between the system memory and the software unit.

12. A method for facilitating debugging of operations performed by a hardware unit and a software unit that are included in a data processing system that includes a system memory, wherein a first operation performed by the hardware unit comprises a first plurality of instructions that read data from the system memory, perform a first computation, and write a result of the first computation to the system memory, wherein a second operation performed by the software unit comprises a second plurality of instructions that read data from the system memory, perform a second computation, and write a result of the second computation to the system memory, the method comprising:
   recording information pertaining to each of the first plurality of instructions performed by the hardware unit in separate memory information blocks within a debug data memory;
   recording information pertaining to each of the second plurality of instructions in separate memory information blocks within the debug data memory;
   creating a first linked relationship between first and second ones of the separate memory information blocks, wherein the first one of the separate memory information blocks represents a read instruction of data from the system memory by the hardware unit, and wherein the second one of the separate memory information blocks represents a write instruction of data to the system memory by the hardware unit after the hardware unit has processed the data read from the system memory;
   creating a second linked relationship between third and fourth ones of the separate memory information blocks, wherein the third one of the separate memory information blocks represents a read instruction of data from the system memory by the software unit, and wherein the fourth one of the separate memory information blocks represents a write instruction of data to the system memory by the software unit after the software unit has processed the data read from the system memory; and
   creating a third linked relationship between fifth and sixth ones of the separate memory information blocks, wherein the fifth one of the separate memory information blocks represents a first exchange of specific data between the system memory and the hardware unit, and wherein the sixth one of the separate memory information blocks represents a second exchange of the specific data between the system memory and the software unit.

13. The method as recited in claim 12, wherein the recording of the information pertaining to the second plurality of instructions performed by the software unit in the debug data memory further comprises:
   determining whether a first one of the second plurality of instructions performed by the software unit accessed data residing in the system memory;
   if the first one of the second plurality of instructions performed by the software unit accessed data residing in the system memory, determining whether the first one of the second plurality of instructions comprised a load of data into a general purpose register;
   if the first one of the second plurality of instructions did not comprise the load of data into the general purpose register, then recording the information pertaining to the first one of the second plurality of instructions performed by the software unit into the fourth one of the separate memory information blocks;
   if the first one of the second plurality of instructions comprised the load of data into the general purpose register, then (1) updating a register load map bank entry associated with the general purpose register, wherein the register load map bank entry is updated to include a pointer to the third one of the separate memory information blocks, and (2) recording the information pertaining to the first one of the second plurality of instructions performed by the software unit into the third one of the separate memory information blocks; and
   if the first one of the second plurality of instructions performed by the software unit did not access data residing in the system memory, then updating a register load map bank entry associated with the general purpose register, wherein the register load map bank entry is updated to include a pointer to the third one of the separate memory information blocks.

14. The method as recited in claim 12, wherein the creating the first linked relationship between the first and second ones of the separate memory information blocks further comprises:
   traversing forwards through the separate memory information blocks to find a memory information block representing a last instruction performed by the hardware operation, wherein the memory information block representing the last instruction performed by the hardware operation is the second one of the separate memory information blocks;
   traversing backwards through the separate memory information blocks from the second one of the separate memory information blocks to find the first one of the separate memory information blocks;
   inserting a first pointer to the first one of the separate memory information blocks into a memory read list field of the second one of the separate memory information blocks; and
   inserting a second pointer to the second one of the separate memory information blocks into a block sequential field of the first one of the separate memory information blocks.

15. The method as recited in claim 12, wherein the creating the second linked relationship between the third and fourth ones of the separate memory information blocks further comprises:
   traversing forwards through the separate memory information blocks to find a memory information block representing a last instruction performed by the software operation, wherein the memory information block representing the last instruction performed by the software operation is the fourth one of the separate memory information blocks;
   traversing through the separate memory information blocks pointed to by a load block pointer field of the fourth one of the separate memory information blocks;
   inserting a third pointer into the memory read list field of the fourth one of the separate memory information blocks, wherein the third pointer points to the third one of the separate memory information blocks; and
   inserting a fourth pointer to the fourth one of the separate memory information blocks into a block sequential field of the first one of the separate memory information blocks.

16. The method as recited in claim 12, wherein the creating the third linked relationships between the fifth and sixth ones of the separate memory information blocks further comprises:

traversing forwards through the separate memory information blocks to find a memory information block representing a write instruction of data to the system memory by either the hardware or the software unit;

traversing forwards through the separate memory information blocks from the memory information block representing the write instruction of data to the system memory by either the hardware or the software unit to find a memory information block representing a read instruction consuming at least part of the write instruction data;

inserting a first pointer to the memory information block representing the read instruction consuming at least part of the write instruction data into a consumer linked list field of the memory information block representing the write instruction of data to the system memory by either the hardware or the software unit; and inserting a second pointer to the memory information block representing the write instruction of data to the system memory by either the hardware or the software unit into a producer linked list field of the memory information block representing the read instruction consuming at least part of the write instruction data.

17. The method as recited in claim 12, wherein the creating the first linked relationship between the first and second ones of the separate memory information blocks further comprises:

traversing forwards through the separate memory information blocks to find a memory information block representing a last instruction performed by the hardware operation, wherein the memory information block representing the last instruction performed by the hardware operation is the second one of the separate memory information blocks;

traversing backwards through the separate memory information blocks from the second one of the separate memory information blocks to find the first one of the separate memory information blocks;

inserting a first pointer to the first one of the separate memory information blocks into a memory read list field of the second one of the separate memory information blocks; and inserting a second pointer to the second one of the separate memory information blocks into a block sequential field of the first one of the separate memory information blocks, wherein the creating the second linked relationship between the third and fourth ones of the separate memory information blocks further comprises:

traversing forwards through the separate memory information blocks to find a memory information block representing a last instruction performed by the software operation, wherein the memory information block representing the last instruction performed by the software operation is the fourth one of the separate memory information blocks;

traversing through the separate memory information blocks pointed to by a load block pointer field of the fourth one of the separate memory information blocks;

inserting a third pointer into the memory read list field of the fourth one of the separate memory information blocks, wherein the third pointer points to the third one of the separate memory information blocks; and inserting a fourth pointer to the fourth one of the separate memory information blocks into a block sequential field of the first one of the separate memory information blocks, wherein the creating the third linked relationships between the fifth and sixth ones of the separate memory information blocks further comprises:

traversing forwards through the separate memory information blocks to find a memory information block representing a write instruction of data to the system memory by either the hardware or the software unit;

traversing forwards through the separate memory information blocks from the memory information block representing the write instruction of data to the system memory by either the hardware or the software unit to find a memory information block representing a read instruction consuming at least part of the write instruction data;

inserting a first pointer to the memory information block representing the read instruction consuming at least part of the write instruction data into a consumer linked list field of the memory information block representing the write instruction of data to the system memory by either the hardware or the software unit; and inserting a second pointer to the memory information block representing the write instruction of data to the system memory by either the hardware or the software unit into a producer linked list field of the memory information block representing the read instruction consuming at least part of the write instruction data.

18. The method as recited in 17, further comprising generating a producer list for a specific instruction, wherein the producer list includes an identification of each system memory access that had an effect on data pertaining to the specific instruction, wherein the generating of the producer list further comprises utilizing the block sequential, memory read list, and producer linked list fields to identify each system memory access that had the effect on the data pertaining to the specific instruction.

19. The method as recited in 17, further comprising generating a consumer list for a specific instruction, wherein the consumer list includes an identification of each system memory access that had an effect on data pertaining to the specific instruction, wherein the generating of the consumer list further comprises utilizing the block sequential, memory write list, and consumer linked list fields to identify each system memory access that had the effect on the data pertaining to the specific instruction.

\* \* \* \* \*